US008880678B1

(12) United States Patent
Colton et al.

(10) Patent No.: US 8,880,678 B1
(45) Date of Patent: *Nov. 4, 2014

(54) SYSTEM AND METHOD FOR MANAGING AND MONITORING A WEB APPLICATION USING MULTIPLE CLOUD PROVIDERS

(75) Inventors: Paul Colton, Hillsborough, CA (US); Uri Sarid, Menlo Park, CA (US)

(73) Assignee: Appcelerator, Inc., Mountain View, CA (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/478,740

(22) Filed: Jun. 4, 2009

Related U.S. Application Data

(60) Provisional application No. 61/058,928, filed on Jun. 5, 2008.

(51) Int. Cl.
*G06F 15/16* (2006.01)
*G06F 9/50* (2006.01)

(52) U.S. Cl.
CPC ................... *G06F 9/5083* (2013.01)
USPC ........... 709/224; 709/203; 709/206; 709/227; 709/235; 717/103; 718/105

(58) Field of Classification Search
CPC ................ H04L 47/00; H04L 12/5855; H04L 20/08144; H04L 20/08177; G06F 9/5083; G06F 9/505; G06F 9/5088
USPC .......................................................... 709/224
See application file for complete search history.

(56) References Cited

U.S. PATENT DOCUMENTS

| | | |
|---|---|---|
| 4,989,132 A | 1/1991 | Mellender et al. |
| 5,361,351 A | 11/1994 | Lenkov et al. |
| 5,448,740 A | 9/1995 | Kiri et al. |
| 5,812,851 A | 9/1998 | Levy et al. |
| 5,821,851 A | 10/1998 | Blackmer |
| 5,878,223 A | 3/1999 | Becker et al. |
| 6,067,413 A | 5/2000 | Gustafsson et al. |
| 6,144,962 A | 11/2000 | Weinberg et al. |
| 6,185,587 B1 | 2/2001 | Bernardo et al. |
| 6,192,382 B1 | 2/2001 | Lafer et al. |
| 6,240,414 B1 | 5/2001 | Beizer et al. |
| 6,324,686 B1 | 11/2001 | Komatsu et al. |
| 6,356,283 B1 | 3/2002 | Guedalia |
| 6,381,737 B1 | 4/2002 | Click, Jr. et al. |
| 6,453,335 B1 | 9/2002 | Kaufmann |
| 6,539,433 B1 | 3/2003 | Tominaga et al. |
| 6,609,246 B1 * | 8/2003 | Guhr et al. ..................... 717/103 |
| 6,684,369 B1 | 1/2004 | Bernardo et al. |

(Continued)

OTHER PUBLICATIONS

Non-Final Office Action mailed Feb. 3, 2011 from U.S. Appl. No. 12/477,842.

(Continued)

*Primary Examiner* — Phuoc Nguyen
*Assistant Examiner* — Kishin G Belani
(74) *Attorney, Agent, or Firm* — Staniford Tomita LLP

(57) ABSTRACT

A system and method for managing and monitoring a web application that uses multiple cloud providers. Preferably, a cloud manager monitors the web applications and pulls web resources from multiple cloud providers. The system and method preferably allows for automatic wiring from a cloud provider to a web application, and allows for use of different Web resources from multiple cloud providers. The cloud manager also preferably allows for automatic scaling for the web application.

15 Claims, 15 Drawing Sheets

(56) References Cited

U.S. PATENT DOCUMENTS

| | | |
|---|---|---|
| 6,779,114 B1 | 8/2004 | Chow et al. |
| 6,915,454 B1 | 7/2005 | Moore et al. |
| 6,941,562 B2 | 9/2005 | Gao et al. |
| 6,981,215 B1 | 12/2005 | Lindhorst et al. |
| 6,990,653 B1 | 1/2006 | Burd et al. |
| 7,000,008 B2 | 2/2006 | Bautista-Lloyd et al. |
| 7,047,318 B1 | 5/2006 | Svedloff |
| 7,051,084 B1 | 5/2006 | Hayton et al. |
| 7,058,633 B1 | 6/2006 | Gnagy et al. |
| 7,062,506 B2 | 6/2006 | Taylor et al. |
| 7,086,041 B2 | 8/2006 | Plesko et al. |
| 7,103,600 B2 | 9/2006 | Mullins |
| 7,103,881 B2 | 9/2006 | Stone |
| 7,117,504 B2 | 10/2006 | Smith et al. |
| 7,124,445 B2 | 10/2006 | Cronce et al. |
| 7,139,798 B2 | 11/2006 | Zircher et al. |
| 7,143,136 B1 | 11/2006 | Drenan et al. |
| 7,167,862 B2 | 1/2007 | Mullins |
| 7,213,231 B1 | 5/2007 | Bandhole et al. |
| 7,222,336 B2 | 5/2007 | Willis |
| 7,231,644 B2 | 6/2007 | Kieffer |
| 7,269,636 B2 | 9/2007 | McCollum et al. |
| 7,284,054 B2 | 10/2007 | Radhakrishman |
| 7,308,648 B1 | 12/2007 | Buchthal et al. |
| 7,313,789 B1 | 12/2007 | Yellin et al. |
| 7,333,801 B2 | 2/2008 | Chandhok |
| 7,386,786 B2 | 6/2008 | Davis et al. |
| 7,389,330 B2 | 6/2008 | Dillon et al. |
| 7,426,723 B1 | 9/2008 | Nikolov |
| 7,454,526 B2 | 11/2008 | Brown et al. |
| 7,478,401 B2 | 1/2009 | Irassar et al. |
| 7,478,408 B2 | 1/2009 | Sesma |
| 7,487,201 B1 | 2/2009 | Murray et al. |
| 7,496,841 B2 | 2/2009 | Hadfield et al. |
| 7,506,315 B1 | 3/2009 | Kabadiyski et al. |
| 7,509,654 B2 | 3/2009 | Jennings et al. |
| 7,543,267 B2 | 6/2009 | Lindhorst et al. |
| 7,543,271 B2 | 6/2009 | Gadre |
| 7,555,484 B2 | 6/2009 | Kulkarni et al. |
| 7,614,052 B2 | 11/2009 | Wei |
| 7,653,623 B2 | 1/2010 | Kashima et al. |
| 7,685,609 B1 | 3/2010 | McLellan |
| 7,725,530 B2 | 5/2010 | Sah et al. |
| 7,823,009 B1 | 10/2010 | Tormasov et al. |
| 7,921,353 B1 | 4/2011 | Murray |
| 2001/0025373 A1 | 9/2001 | Gebhart et al. |
| 2001/0032320 A1 | 10/2001 | Abdelnur et al. |
| 2001/0037292 A1 | 11/2001 | Vogt |
| 2001/0037359 A1 | 11/2001 | Mockett et al. |
| 2002/0007393 A1 | 1/2002 | Hamel |
| 2002/0016828 A1 | 2/2002 | Daugherty et al. |
| 2002/0023158 A1 | 2/2002 | Polizzi et al. |
| 2002/0069255 A1 | 6/2002 | Dinovo |
| 2002/0073235 A1 | 6/2002 | Chen et al. |
| 2002/0099738 A1 | 7/2002 | Grant |
| 2002/0112247 A1 | 8/2002 | Horner et al. |
| 2002/0138555 A1 | 9/2002 | Yu |
| 2002/0184363 A1 | 12/2002 | Viavant et al. |
| 2003/0005044 A1 | 1/2003 | Miller et al. |
| 2003/0061404 A1 | 3/2003 | Atwal et al. |
| 2003/0084431 A1 | 5/2003 | Kobayashi |
| 2003/0088687 A1 | 5/2003 | Begeja et al. |
| 2003/0105810 A1 | 6/2003 | McCrory et al. |
| 2003/0145282 A1 | 7/2003 | Thomas et al. |
| 2003/0177176 A1* | 9/2003 | Hirschfeld et al. ........... 709/203 |
| 2003/0195923 A1 | 10/2003 | Bloch et al. |
| 2003/0226110 A1 | 12/2003 | Scheering |
| 2004/0003377 A1 | 1/2004 | Di Loreto |
| 2004/0010621 A1 | 1/2004 | Afergan et al. |
| 2004/0021679 A1 | 2/2004 | Chapman et al. |
| 2004/0061713 A1 | 4/2004 | Jennings |
| 2004/0064822 A1 | 4/2004 | Noda |
| 2004/0066410 A1 | 4/2004 | Lindhorst et al. |
| 2004/0133848 A1 | 7/2004 | Hunt et al. |
| 2004/0143823 A1 | 7/2004 | Wei |
| 2004/0158843 A1 | 8/2004 | Cloccarelli |
| 2004/0167784 A1 | 8/2004 | Travieso et al. |
| 2004/0167876 A1 | 8/2004 | Salerno et al. |
| 2004/0168162 A1 | 8/2004 | Park et al. |
| 2004/0177147 A1 | 9/2004 | Joshi et al. |
| 2004/0177335 A1 | 9/2004 | Beisiegel et al. |
| 2004/0201618 A1 | 10/2004 | Alderson |
| 2004/0205411 A1 | 10/2004 | Hong et al. |
| 2004/0210865 A1 | 10/2004 | Shimura |
| 2004/0225633 A1 | 11/2004 | Jau |
| 2004/0236927 A1 | 11/2004 | Irie et al. |
| 2004/0250262 A1 | 12/2004 | Irassar et al. |
| 2004/0268303 A1 | 12/2004 | Abe et al. |
| 2005/0005160 A1 | 1/2005 | Bates et al. |
| 2005/0015759 A1 | 1/2005 | Zatloukal |
| 2005/0027823 A1 | 2/2005 | Rana |
| 2005/0043940 A1 | 2/2005 | Elder |
| 2005/0044197 A1 | 2/2005 | Lai |
| 2005/0066319 A1 | 3/2005 | DeLine et al. |
| 2005/0069207 A1 | 3/2005 | Zakrzewski et al. |
| 2005/0086344 A1 | 4/2005 | Suesserman |
| 2005/0091576 A1 | 4/2005 | Relyea et al. |
| 2005/0091650 A1 | 4/2005 | Heeb |
| 2005/0102400 A1 | 5/2005 | Nakahara et al. |
| 2005/0144622 A1 | 6/2005 | Ballinger et al. |
| 2005/0160415 A1 | 7/2005 | Kwon et al. |
| 2005/0172338 A1 | 8/2005 | Sandu et al. |
| 2005/0182778 A1 | 8/2005 | Heuer et al. |
| 2005/0188051 A1 | 8/2005 | Sneh |
| 2005/0198202 A1 | 9/2005 | Yamamoto |
| 2005/0246391 A1 | 11/2005 | Gross |
| 2005/0256933 A1 | 11/2005 | Millington et al. |
| 2005/0278641 A1 | 12/2005 | Mansour et al. |
| 2006/0015842 A1 | 1/2006 | DeSantis |
| 2006/0047780 A1 | 3/2006 | Patnude |
| 2006/0064434 A1 | 3/2006 | Gilbert et al. |
| 2006/0075088 A1 | 4/2006 | Guo et al. |
| 2006/0080592 A1 | 4/2006 | Alves de Moura et al. |
| 2006/0123397 A1 | 6/2006 | McGuire |
| 2006/0129997 A1 | 6/2006 | Stichnoth et al. |
| 2006/0136555 A1 | 6/2006 | Patrick et al. |
| 2006/0136712 A1 | 6/2006 | Nagendra et al. |
| 2006/0149746 A1 | 7/2006 | Bansod et al. |
| 2006/0150111 A1 | 7/2006 | Farber |
| 2006/0155707 A1 | 7/2006 | Marcjan |
| 2006/0167981 A1 | 7/2006 | Bansod et al. |
| 2006/0173998 A1 | 8/2006 | Ohara |
| 2006/0190997 A1 | 8/2006 | Mahajani et al. |
| 2006/0200503 A1 | 9/2006 | Dosa et al. |
| 2006/0230149 A1 | 10/2006 | Jackson |
| 2006/0253508 A1 | 11/2006 | Colton et al. |
| 2006/0259592 A1 | 11/2006 | Angeline |
| 2006/0277250 A1 | 12/2006 | Cherry et al. |
| 2007/0011650 A1 | 1/2007 | Hage et al. |
| 2007/0055964 A1 | 3/2007 | Mirkazemi et al. |
| 2007/0061700 A1 | 3/2007 | Kothari et al. |
| 2007/0067418 A1 | 3/2007 | Isaacs et al. |
| 2007/0073739 A1 | 3/2007 | Jennings et al. |
| 2007/0100967 A1 | 5/2007 | Smith et al. |
| 2007/0106946 A1 | 5/2007 | Goetz et al. |
| 2007/0107057 A1 | 5/2007 | Chander et al. |
| 2007/0113188 A1 | 5/2007 | Bales et al. |
| 2007/0124500 A1 | 5/2007 | Bedingfield, Sr. et al. |
| 2007/0136201 A1 | 6/2007 | Sah et al. |
| 2007/0136477 A1 | 6/2007 | Bryce et al. |
| 2007/0143283 A1 | 6/2007 | Spencer et al. |
| 2007/0143672 A1 | 6/2007 | Lipton et al. |
| 2007/0150480 A1 | 6/2007 | Hwang et al. |
| 2007/0174419 A1 | 7/2007 | O'Connell et al. |
| 2007/0214239 A1 | 9/2007 | Mechkov et al. |
| 2007/0214261 A1* | 9/2007 | Kikuchi et al. ............... 709/224 |
| 2007/0231781 A1 | 10/2007 | Zimmermann et al. |
| 2007/0240032 A1 | 10/2007 | Wilson |
| 2007/0250513 A1 | 10/2007 | Hall et al. |
| 2007/0288858 A1 | 12/2007 | Pereira et al. |
| 2008/0010338 A1 | 1/2008 | Curtis et al. |
| 2008/0077556 A1 | 3/2008 | Muriente |
| 2008/0082965 A1 | 4/2008 | Atkin et al. |
| 2008/0104025 A1 | 5/2008 | Dharamshi et al. |

(56) References Cited

U.S. PATENT DOCUMENTS

| | | | |
|---|---|---|---|
| 2008/0104224 A1 | 5/2008 | Litofsky et al. | |
| 2008/0140786 A1* | 6/2008 | Tran | 709/206 |
| 2008/0243475 A1 | 10/2008 | Everhart et al. | |
| 2008/0244586 A1 | 10/2008 | Hopp | |
| 2008/0288739 A1* | 11/2008 | Bamba et al. | 711/172 |
| 2008/0294794 A1 | 11/2008 | Darugar et al. | |
| 2008/0295004 A1 | 11/2008 | Coca et al. | |
| 2008/0295164 A1 | 11/2008 | Steiner et al. | |
| 2008/0301696 A1* | 12/2008 | Tantawi et al. | 718/105 |
| 2008/0307389 A1 | 12/2008 | Marchant | |
| 2009/0013255 A1 | 1/2009 | Yuschik et al. | |
| 2009/0030926 A1 | 1/2009 | Aharoni et al. | |
| 2009/0100154 A1 | 4/2009 | Stevenson et al. | |
| 2009/0106052 A1 | 4/2009 | Moldovan | |
| 2009/0106413 A1 | 4/2009 | Salo et al. | |
| 2009/0119675 A1 | 5/2009 | Higgins et al. | |
| 2009/0172792 A1 | 7/2009 | Backhouse | |
| 2009/0210631 A1 | 8/2009 | Bosworth et al. | |
| 2009/0216910 A1* | 8/2009 | Duchesneau | 709/250 |
| 2009/0282136 A1 | 11/2009 | Subramanian | |
| 2009/0287734 A1 | 11/2009 | Borders | |
| 2009/0300210 A1* | 12/2009 | Ferris | 709/235 |
| 2010/0035690 A1 | 2/2010 | Blackburn et al. | |
| 2010/0036903 A1 | 2/2010 | Ahmad et al. | |
| 2010/0042670 A1 | 2/2010 | Kamalakantha et al. | |
| 2010/0064234 A1 | 3/2010 | Schreiber et al. | |
| 2010/0070566 A1 | 3/2010 | Vandewalle | |
| 2010/0174607 A1 | 7/2010 | Henkin et al. | |
| 2010/0223385 A1 | 9/2010 | Gulley et al. | |
| 2010/0318665 A1* | 12/2010 | Demmer et al. | 709/227 |

OTHER PUBLICATIONS

Non-Final Office Action mailed Oct. 20, 2011 from U.S. Appl. No. 12/477,842.

Non-Final Office Action mailed Nov. 24, 2010 from U.S. Appl. No. 12/478,743.

Final Office Action mailed Aug. 9, 2011 from U.S. Appl. No. 12/478,743.

Non-Final Office Action mailed Aug. 28, 2012 from U.S. Appl. No. 12/478,746.

Gudeman, et al., Representing Type Information Dynamically Typed Languages; 1993, acquired from http://citeseerx.ist.psu.edu/viewdoc/download?doi=10.1.1.39.4394&rep=rep1&type=pdf, pp. 1.38.

Shao, et al., A type-based compiler for standard ML;ACM, 1995, pp. 116-129.

Server Side JavaScript Guide, Nov. 12, 1998, Netscape Communications Corp., pp. 1-4.

Lars Aronsson, Operation of a Large Scale, General Purpose Wiki Website, VWF Berlin, 2002, pp. 27-37.

Morfik announces Ajax IDE, Wednesday Sep. 28, 2005, ajaxian.com, pp. 1-3.

Susanne Hupfer, Li-Te Cheng, Steven Ross, John Patterson, Introducing Collaboration into an Application Development Environment, Nov. 6-10, 2004, ACM, vol. 6, Issue 3; pp. 21-24.

Anonymous, Creating Accessible JavaScript—JavaScript Event Handlers, published at http://webaim.org/techniques/javascript/eventhandlers.

Written Opinion of the International Searching Authority for PCT/US07/01697.

Written Opinion of the International Searching Authority for PCT/US07/66673.

Niels Leenheer, rakaz, "Make your pages load faster by combining and compressing javascript and css files," Dec. 18, 2006, rakaz.nl/2006/12/make-your-pages-load-faster-by-combining-and-compressing-javascript-and-css-files.html, pp. 1-4.

Steve Vinoski, "Scripting JAX-WS," IEEE Internet Computing, May & Jun. 2006, pp. 91-94.

Mitchell, Scott, URL Rewriting in asp.net, published Mar. 2004 at http://msdn.microsoft.com/en-us/library/ms972974.aspx.

Making JavaScript Smaller: Dojo's Compressor, downloaded from The Internet WaybackMachine http://web.archive.org/web/20061114133532/http://dojotoolkit.org/docs/compressor_system.html on Sep. 13, 2011, archived on Nov. 11, 2006.

JSMIN, The JavaScript Minifier, Douglas Crockford, www.crockford.com, Dec. 4, 2003, downloaded Sep. 13, 2011 from http://www.crockford.com/javascript/jsmin.html.

Portions of the file history of U.S. Appl. No. 12/477,842.

Portions of the file history of U.S. Appl. No. 12/478,743.

Portions of the file history of U.S. Appl. No. 12/478,746.

* cited by examiner

SYSTEM AND METHOD FOR MANAGING AND MONITORING A WEB APPLICATION USING MULTIPLE CLOUD PROVIDERS

CROSS REFERENCE TO RELATED APPLICATION

The Present Application claims priority to U.S. Provisional Patent Application No. 61/058,928, filed on Jun. 5, 2008, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to cloud computing. More specifically, the present invention relates to a system and method for managing and monitoring a web application that uses multiple cloud providers.

2. Description of the Related Art

In general terms, cloud computing provides a developer (individual or company) to have access to resources for a Web application, in particular a web site. Various vendors provide cloud computing to the developer community. Such vendors include JOYENT (see joyent.com), Amazon Web Services (See amazon.com), Google App Engine (see http://code.google.com/appengine/) and others.

General definitions for terms utilized in the pertinent art are set forth below.

Applets or Java Applets are mini-executable programs named with the .class suffix and are placed on the web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Asynchronous Server-Side Processing is a means for avoiding having to reload a new page for every request sent by a client and involves placing a intermediary between a client and server in order to send a request to the intermediary (i.e. XMLHttpRequest object) which sends it to the server for processing and receives the response from the server for passing on to the client.

Boot or Bootstrap refers to loading the first piece of software that starts a computer since the operating system is essential for running all other programs, it is usually the first piece of software loaded during the boot process.

A Channel is information about organized content on an intranet or the Internet. Channels enable Web developers to categorize and describe Web site content and make that data available to users on demand.

Cloud computing is generally defined as using computing resources, primarily servers, owned by a third party provider (such as the AMAZON ELASTIC COMPUTE CLOUD, JOYENT, and GOOGLE APPS) such that the user does not need to make a substantial investment in computer hardware and scale resources depending on the user's needs. Cloud computing primarily involves Web applications but can include storage, raw computing and other specialized services.

FTP or File Transfer Protocol is a protocol for moving files over the Internet from one computer to another.

HyperText Markup Language (HTML) is a method of mixing text and other content with layout and appearance commands in a file, so that a browser can generate a display from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JSON is JavaScript Object Notation format, which is a way of taking data and turning it into valid a representation of program information that can be read by another program.

MySQL is a relational database management system which relies on SQL for processing data in a database.

Parser is a component of a compiler that analyzes a sequence of tokens to determine its grammatical structure with respect to a given formal grammar. Parsing transforms input text into a data structure, usually a tree, which is suitable for later processing and which captures the implied hierarchy of the input. XML Parsers ensure that an XML document follows the rules of XML markup syntax correctly.

Platform is the combination of a client computer, an operating system, and a browser, which together can support HTTP access and in particular the operation of interactive forms.

Portlet is a Web based component that will process requests and generate dynamic content. The end-user essentially sees a portlet as being a specialized content area within a Web page that occupies a small window. One could use this content area (the portlet) to receive different types of information. The portlet provides users with the capability to customize the content, appearance and position of the portlet.

Provisioning is the act of supplying and configuring computing resources, primarily servers, for a web application.

Pulling or Pull Technology is technology that enables Web browsers to retrieve information from a Web server such as updating information at periodic intervals, essentially Web browser initiated activity.

Pushing or Push Technology is technology that initiates delivery of material from a server to a properly configured Web browser, such as providing automatic updates to a Web browser.

Serialization places an object in a binary form for transmission across a network such as the Internet and deserialization involves extracting a data structure from a series of bytes.

Servlets are objects that receive requests and generate a response based on that request.

SQL (Structured Query Language) is a computer language designed for data retrieval and data management in a database.

Structural layer of a web page is the marked up document and foundation on which other layers may be applied.

URL or Uniform Resource Locator is a address on the World Wide Web.

User is a client computer, generally operated by a human being, but in some system contexts running an automated process not under full-time human control.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

As shown in FIG. 1A, a cloud computing system 20' of the prior art generally involves a single cloud provider 28' which is accessed from a user 22' at a user interface 24' over a network 40' such as the Internet. The user 22' can only work with the single cloud provider 28' and is provided very little information about the performance of the web application on the cloud provider 28'. Further, in order to scale up, the user 22' must repeat the uploading process.

However, current technologies fail to provide a system and method for managing and monitoring a web application using web resources from multiple cloud providers.

BRIEF SUMMARY OF THE INVENTION

The Present Invention overcomes the obstacles of the prior art and provides a method and system for managing and monitoring a web application using web resources from multiple cloud providers.

One aspect is a system for managing a web application. The system includes a network, a primary cloud provider having a primary plurality of web resources, a web application located at the primary cloud provider, at least one secondary cloud provider having a secondary plurality of web resources and a cloud manager. The cloud manager has an API. The cloud manager remotely manages the web application. The cloud manager is capable of monitoring the web application to determine if a current level of web resources is appropriate for the web application to perform within a predetermined performance range. The cloud manager is capable of accessing and providing the primary plurality of web resources from the primary cloud provider to the web application and the cloud manager is capable of accessing and providing the secondary plurality of web resources from the secondary cloud provider to the web application.

Another aspect is a system for remotely managing a web site utilizing multiple cloud providers. The system includes a network, a primary cloud provider having a primary plurality of web resources, a web site located at the primary cloud provider, a plurality of secondary cloud providers, a cloud manager and a tier interface. Each of the plurality of secondary cloud providers has a secondary plurality of web resources. The cloud manager has an API. The cloud manager remotely manages the web application. The cloud manager is capable of monitoring the web application to determine if a current level of web resources is appropriate for the web application to perform within a predetermined performance range. The cloud manager is capable of accessing and providing the primary plurality of web resources from the primary cloud provider to the web application and the cloud manager is capable of accessing and providing the secondary plurality of web resources from the secondary cloud provider to the web application. The user interface allows an operator to access the cloud manager.

The system also preferably includes an internal IT site with the managing means in communication with the internal IT site. The managing means of the system is preferably capable of changing the web application from a live state to a staging state. The managing means of the system is preferably capable of changing the web application from a provisioning state to a staging state to a live state.

Yet another aspect is a method for remotely managing a web site utilizing multiple cloud providers. The method includes monitoring the activity of a web application located at a primary cloud provider from a remote manager. The method also includes detecting activity outside of a predetermined load to capacity ratio on the web application. The method also includes contacting a secondary cloud provider from the remote manager to obtain a plurality of web resources for the web application. The method also includes allocating the plurality of web resources from the secondary provider to maintain a predetermined load to capacity ratio for the web application. The method also includes automatically wiring the plurality of web resources from the secondary provider through the remote manager to the web application.

The predetermined load to capacity ratio preferably has an upper limit of 90% (9/10) and a lower limit of 75% (3/4). Managing the web application preferably comprises temporarily adding web resources from the secondary plurality of web resources during a time period of high demand for the web application. Monitoring the performance of the web application preferably comprises monitoring the load on the web application.

Yet another aspect of the present invention is a computer program for remotely managing a web site utilizing multiple cloud providers. The computer program includes means for monitoring the activity of a web application located at a primary cloud provider from a remote manager, means for detecting activity outside of a predetermined load to capacity ratio on the web application, means for contacting a secondary cloud provider from the remote manager to obtain a plurality of web resources for the web application, means for allocating the plurality of web resources from the secondary provider to maintain a predetermined load to capacity ratio for the web application, and means for automatically wiring the plurality of web resources from the secondary provider through the remote manager to the web application.

The computer program also preferably includes means for transferring the web application from a live state to a staging state, from a live state to a virtual state, and from a provisioning state to a staging state.

Yet another aspect of the present invention is a computer program for remotely managing a web site utilizing multiple cloud providers. The computer program includes means for monitoring the activity of a web application located at a primary cloud provider from a remote manager, means for allocating the plurality of web resources from the secondary provider to maintain a predetermined load to capacity ratio for the web application, and means for automatically wiring the plurality of web resources from the secondary provider through the remote manager to the web application.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention provides a novel system and method for a user to develop a web application such as a web site, deploy the web application for access over the Internet, manage and monitor the web application to ensure adequate resources are provided during times of heavy traffic such as heavy viewing of a web site.

Figure 1:
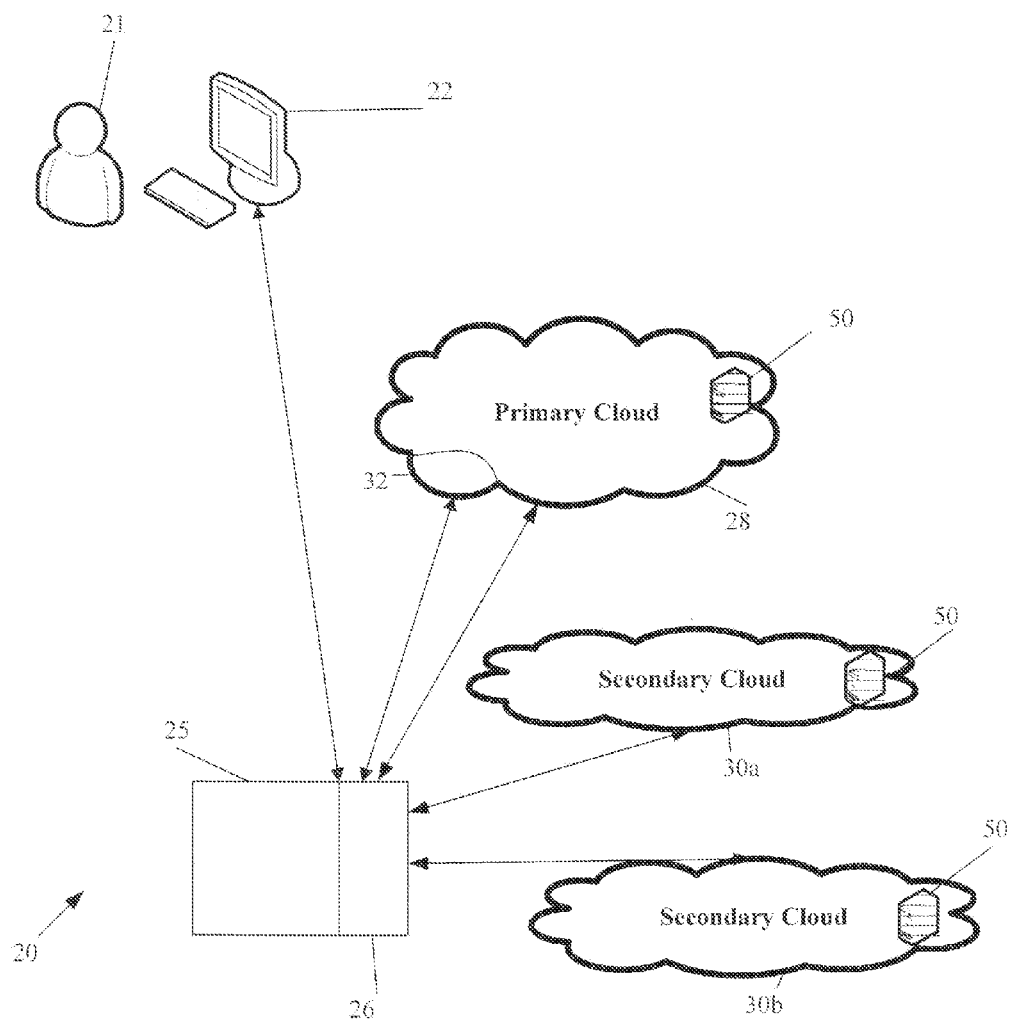
FIG. 1 is a block diagram of a preferred embodiment of a system for managing and monitoring a web application that uses multiple cloud providers.
Figure 1A:
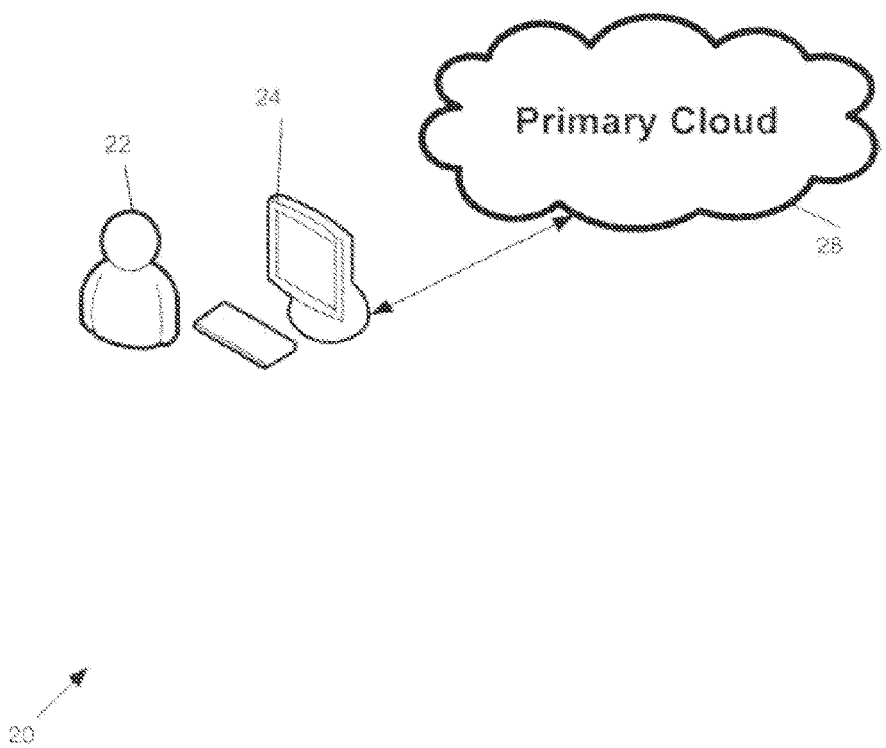
FIG. 1A is a block diagram of a cloud system of the prior art.
Figure 1B:
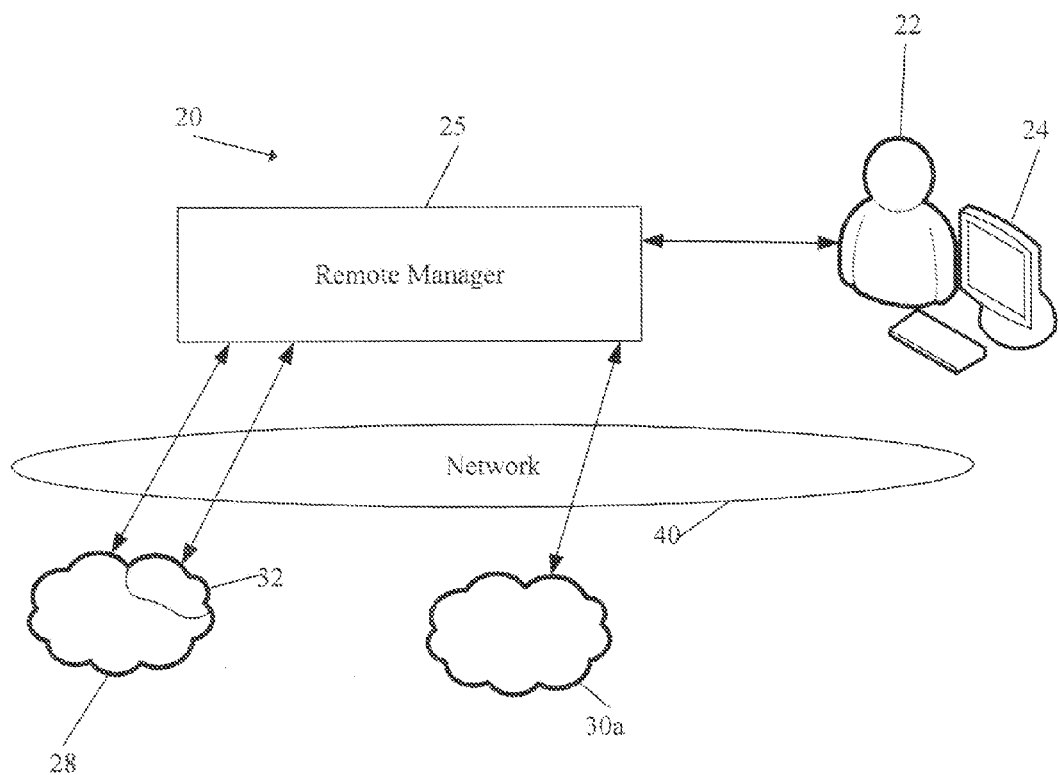
FIG. 1B is a block diagram of an alternative embodiment of a system for managing and monitoring a web application that uses multiple cloud providers.
Figure 1C:
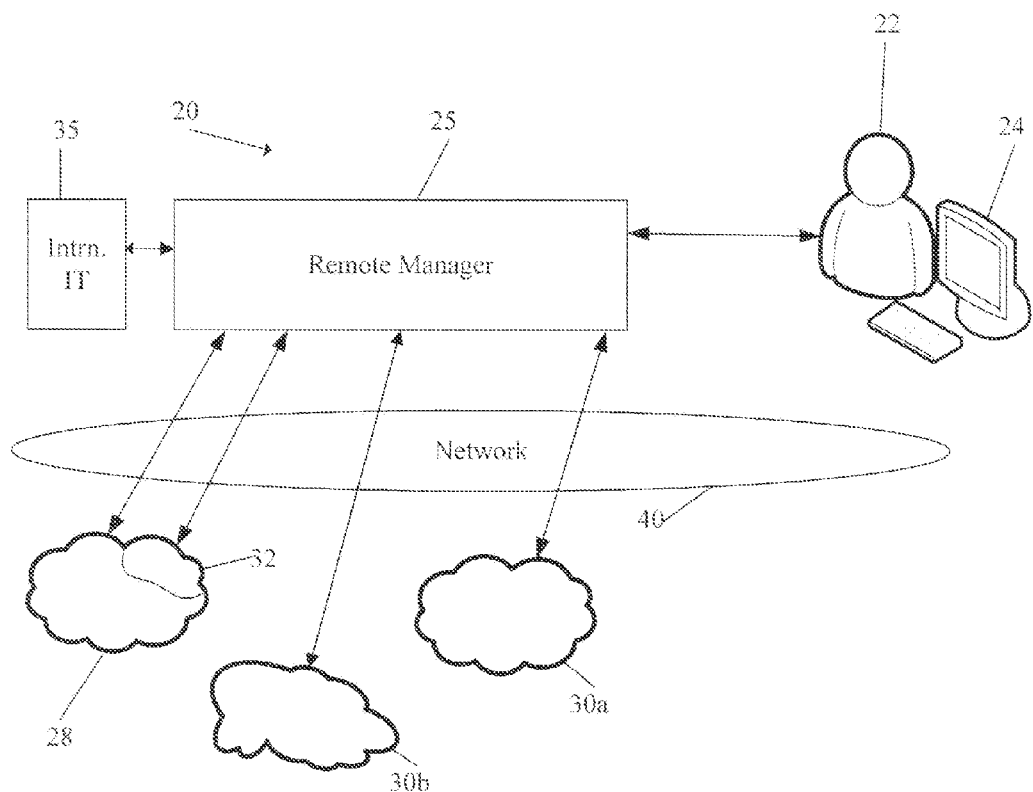
FIG. 1C is a block diagram of an alternative embodiment of a system for managing and monitoring a web application that uses multiple cloud providers.

As shown in FIGS. 1, 1B and 1C, a system 20 generally includes a cloud manager 25 having a cloud manager API 26, a primary cloud provider 28, a secondary cloud provider 30a and a second secondary cloud provider 30b. A web application 32 is located at the primary cloud provider 28. The cloud manager 25 communicates over a network 40 directly with the web application 32, the primary cloud provider 28, the secondary cloud provider 30a and the second secondary cloud provider 30b. Those skilled in the pertinent art will recognize that the system may only include one cloud provider, or more than three cloud providers. A developer/user 22 operating from a user interface 24 also communicates with the remote manager 25. Preferably, the network is the Internet. As shown in FIG. 1C, the cloud manager 25 can also communicate with an internal IT site 35. The cloud manager 25 can transfer the web application from and to a provision state, from and to a staging state and form and to a live state. The cloud manager 25 allows the developer 22 monitor the performance of the web application. The cloud manager 25 automatically wires web resources from the cloud providers 28 and 30 to the web application as needed depending on the load activity on the web application 32.

The cloud manager 25 is preferably an abstraction layer that can utilize multiple cloud providers for a single web application. The cloud manager 25 allows for facilitated synchronization of a web application to a cloud provider and concurrent synchronization to multiple cloud providers. Thus, if a web application 32 requires additional web resources, the cloud manager 25 can simultaneously contact multiple cloud providers and simultaneously allocate web resources from multiple cloud providers to the web application 32. The cloud manager 25 can pull in new servers based on the load activity of a web application. The cloud manager 25 is preferably includes a universal cloud API which allows for access to and allocation of web resources from multiple cloud providers. The cloud manager 25 can also be programmed to provide a predetermined return on investment for a developer wherein the cloud manager 25 allocates resources based on a monetary return from increased activity on a web application. The developer 22 can set limits on the resources or expenses for the web application, or set ratios for return on investment.

The cloud manager 25 can also move a web application to VMware for virtualization purposes. Thus, the cloud manager 25 can take a web site that is live and pull it back to a VMware image. The cloud manager 25 also allows a developer 22 to validate a web site in a staging state before going live with the web site. The developer 22 can validate the web site from a user interface 24. Further, the cloud manager 25 allows for team control of a web site so that various developers can access and control a web application 32.

A user interface 22 (also referred to as UI) is typically a computer which includes a processing means for interacting with various input and output devices ("I/O devices"), and various networks. The I/O Devices can be drives, a keyboard, a display, a scanner, a mouse and the like. The processing means typically includes a CPU such as an INTEL PENTIUM™ processor or the like. The processing means also preferably includes a memory (random access memory and read only memory) and interfaces for communicating with networks and the I/O Devices.

An integrated development environment ("IDE"), such as disclosed in Colton et al., U.S. patent Ser. No. 12/264,882, filed Nov. 4, 2008, for a System And Method For Developing, Deploying, Managing And Monitoring A Web Application In Single Environment which is hereby incorporated by reference in its entirety, may be used with the system and method disclosed herein. The IDE provides a user 21 with the tools necessary to build a Web application such as a Web site. One such IDE is set forth at aptana.com, which is hereby incorporated by reference in its entirety. The APTANA IDE is an open-source, cross-platform, JAVA script-focused development environment for preferably building AJAX applications. However, those skilled in the pertinent art will recognize that other IDEs may be utilized without departing from the scope and spirit of the present invention. The IDE is provided to facilitate the development of software applications or other software programs by one or more software developers. The IDE can include one or more servers, work stations, and other components, as well as languages, compliers, editors, and other tools used by developers in the development environment. The IDE is preferably confined to a single geographic location or alternatively can be distributed across a plurality of geographic locations. A geographically diverse configuration would typically include one or more communication channels (networks or otherwise) among the various development locations to allow for a collaborative work environment. The IDE includes a suite of tools to assist in Web application development projects. Various aspects of a preferred IDE are described below in conjunction with the system and method.

The primary cloud provider 28, first secondary cloud provider 30*a* and second secondary cloud provider 30*b*, and any other cloud providers, each provide Web resources that may be used for the Web application 32. The Web resources are primarily servers, owned by a third party provider (such as the AMAZON ELASTIC COMPUTE CLOUD, JOYENT, and GOOGLE APPS) such that the user does not need to make a substantial investment in computer hardware and can scale resources depending on the user's needs.

The cloud manager 25 automatically manages the Web resource needs of the Web application 32. The cloud manager 25 provisions the Web application 32, syncs the Web application 32, and automatically provides scalability for the Web application 32. A more detailed explanation of the cloud manager is provided below.

Figure 1D:
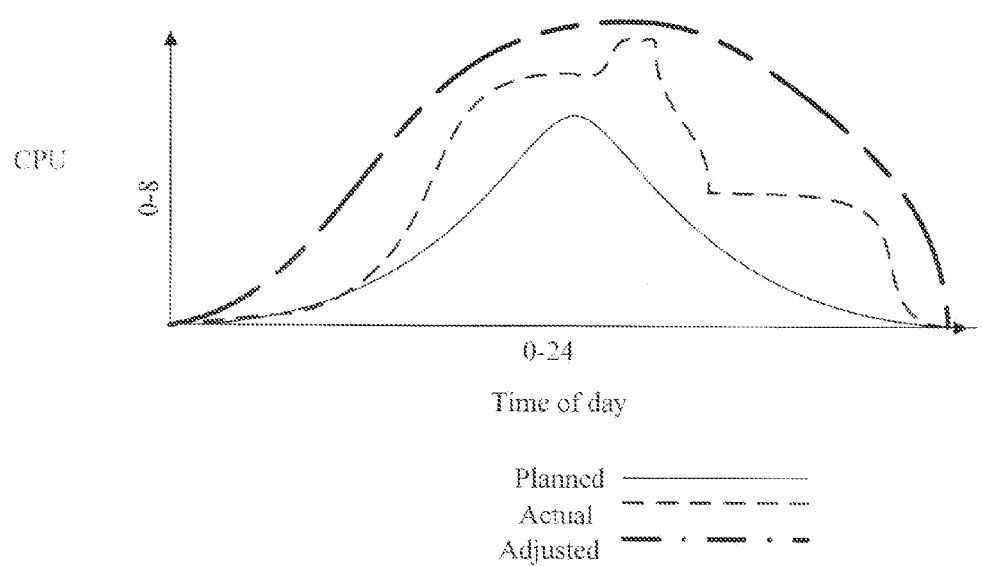
FIG. 1D is a graph of CPU use versus time of day for activity on a web application with graphs demonstrating planned use, actual use and adjusted use.

FIG. 1D illustrates CPU use versus the time of day for an exemplary Web application 32. A developer 22 allocates various amounts of resources for use by the Web application 32 during the day depending on an estimate of the load activity on the Web application 32. A CPU use for a planned activity is shown as a solid line. A dashed line illustrates actual activity which exceeds the planned activity. A dashed line (with longer dashes) illustrates adjusted CPU availability for the Web application 32 as automatically scaled by the cloud manager in reaction to a threshold value of a load to capacity ratio being met on the Web application 32. The cloud manager 25 quickly reacts, contacts cloud providers 30*a* and/or 30*b* for Web resources and wires the resources to the Web application 32 without the need of the developer to take any action. The threshold value is preferably determined by the developer 22. The predetermined load to capacity ratio preferably has an upper limit of 90% (9/10) and a lower limit of 75% (3/4).

Figure 2:
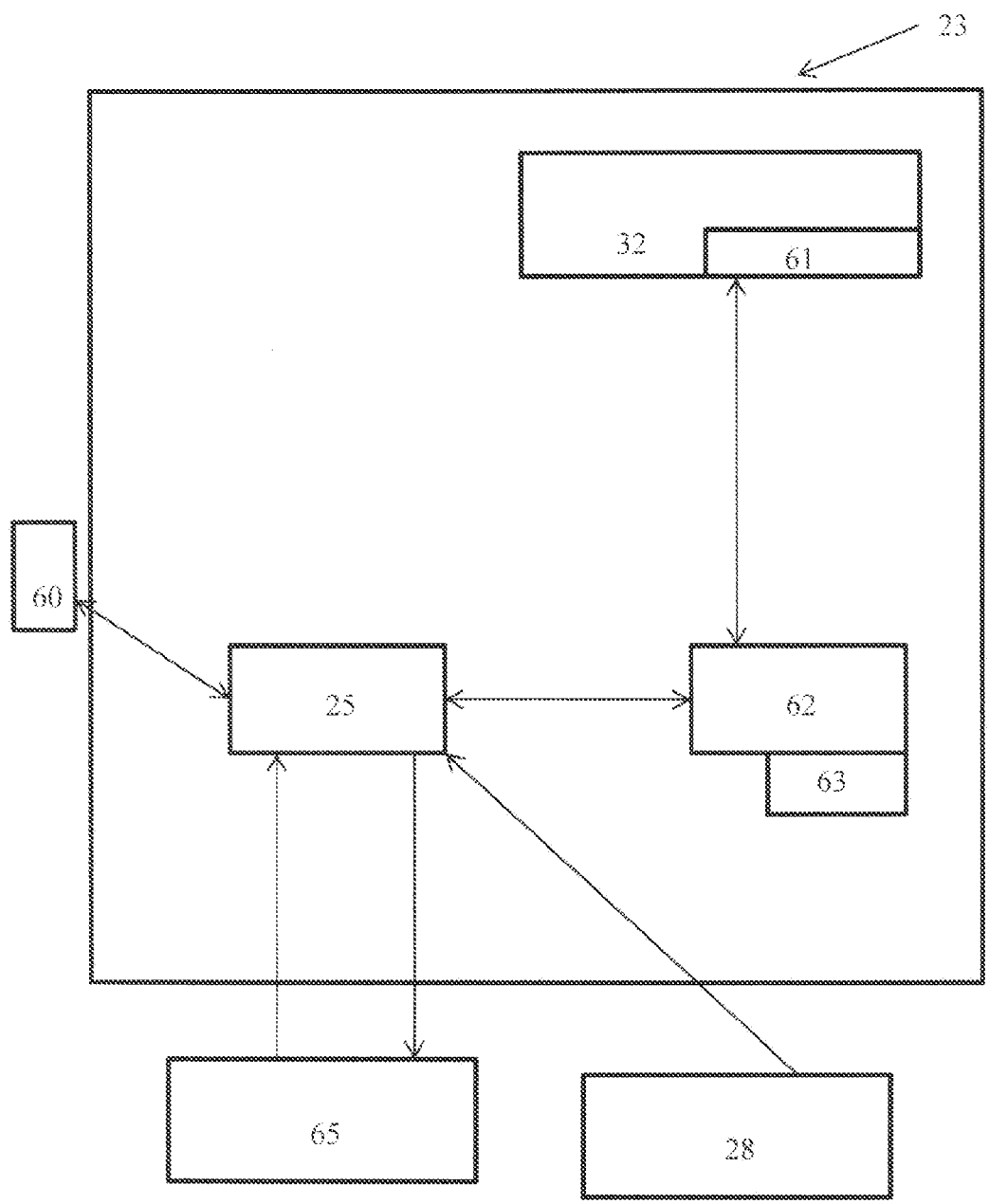
FIG. 2 is a block diagram of a preferred embodiment of the software architecture.

FIG. 2 is a block diagram of the software architecture of the present invention. FIG. 2 illustrates the overall architecture residing in and interacting with the IDE 23. The cloud manager 25 loads once the user logs in using his Aptana ID. This ID is persisted between startup, so that the cloud manager 25 may be loaded immediately when the IDE 23 begins, for example the APTANA Studio. The cloud manager 25 first loads from a local data store model 60, if it exists, and then synchronizes the local data store model 60 with a remote site manager model 65. Any model change events will only be fired for differences found between the local data store model 60 and the site manager model 65. The components of the architecture include the IDE, (STUDIO), the MyCloud Web application 32, the MyCloud server, the site manager provider and the site manager. The MyCloud Web application 32 is located inside an embedded browser of the IDE 23. The MyCloud server comprises a JETTY HTTP server 63, servlets for the IDE requests, (e.g., obtaining projects in the local workspace), servlets that delegate to site manager services (e.g., listing the deployed projects and their status), and a COMET client 62 for messaging bus (pumps events from a messaging queue and a local store). The site manager provider performs client implementation of site manager services, polling the site manager for notifications an events (adds events to a messaging queue and a local store), and maintains and synchronizes a user/project model with the site manager. The site manager contains the Web services for deployed projects and account management.

In an example of a preferred embodiment, the portal index page is at com.aptana.ide.server.jetty/content/index.html.

```
function setup ( )
{
   dojo.require("dojox.cometd");
   dojo.connect (dojox.cometd, "finishInit",
   function (type, data, evt, request) {
   dojox.cometd.subscribe (
      "/portal/portlets/"+dojox.cometd.clientId,
      "echoRpcReturn"
      );
   }
   );
Dojox.cometd.init("/cometd");
}
```

The flow preferably involves the initial portal index page requesting a list of portlets from /portlal/portlets. The IDE 23 returns a list of configured portlets and URL to request a bootstrap JavaScript code (e.g., /portlets/cloud). The portal index page executes the bootstrap code to alter the model and the user interface as appropriate per portlet. The portlet can continue to request new files and resources from for example /portlets/portlet_id/sub urls (/portlets/cloud/images/cloud_portlet_banner.png).

The MyCloud Servlets involve comet architecture that specifies channels for publishing and subscription. A common model involves a client subscribing to a client-id specific channel, but publishing on a generic channel. For example, a client subscribes to /portal.portlets.a1234564, the client publishes to /portal/portlets, with published implicitly including the client ID. The return messages are routed to the specific channel subscribed to by the user. Alternatively, the return messages are routed to a global "broadcast" channel, such as /projects.

The portal is preferably an AJAX Web application that operates on top of the internal Jetty server 63 and communicates with the IDE 23 through comet 61. End users access the portal through IDE buttons, and the basics of starting up and debugging are briefly discussed below. In order to ensure that no XHR requests remain un-terminated (or waiting to time out) when the portal is closed and then re-opened, the IDE 23 completely terminates the internal JETTY server 63 every time that a user closes the portal view. As such, the portal needs to use a different port every time, starting with 8500 and incrementing by 1 each subsequent time the portal is loaded. Similarly, the cometd server runs on its own port, starting with 8600. For the portal to load properly, the portal should preferably be requested as follows: http://localhost:[port number]/index.html?port=[comet port number]. For debugging the portal, the log output contains every major action logged preferably using FIREBUG. Therefore, a review of the log output should identify the problem.

URL parameters are used to have the portal load with specific content rather than the default "Home" page. A specific tab is loaded with a query string pram: tab having possible values of 'my_aptana' or 'my_cloud', for example, http://localhost:8500/index.html?port=8600&tab=my cloud. To a load a specific site in "My Cloud" query string param: siteId with possible values of any site Id for the logged in user for example: http://localhost:8500/index.html?port=8600& tab=my cloud&siteId=1234.

To deploy a project to the Cloud, query string param: project. Possible Values are any undeployed project (url encoded, case-sensitive), for example: http://localhost:8500/ index.html?port=8600&project=MyCoolProject.

To start at a specific product in "My Aptana", query string param: product. Possible Values are studio, plugins, jaxer and cloud. For example: http://localhost:8500/index.html? port=8600&product=plugins.

The servlet listing returns JSON data. Preferably, JSON data will be parsed, not evaluated. Model API directly on cloud manager, or have channels like /project/create?.

Studio-centric requests involve license information, preferences and projects (date/time last updated).

Figure 2A:
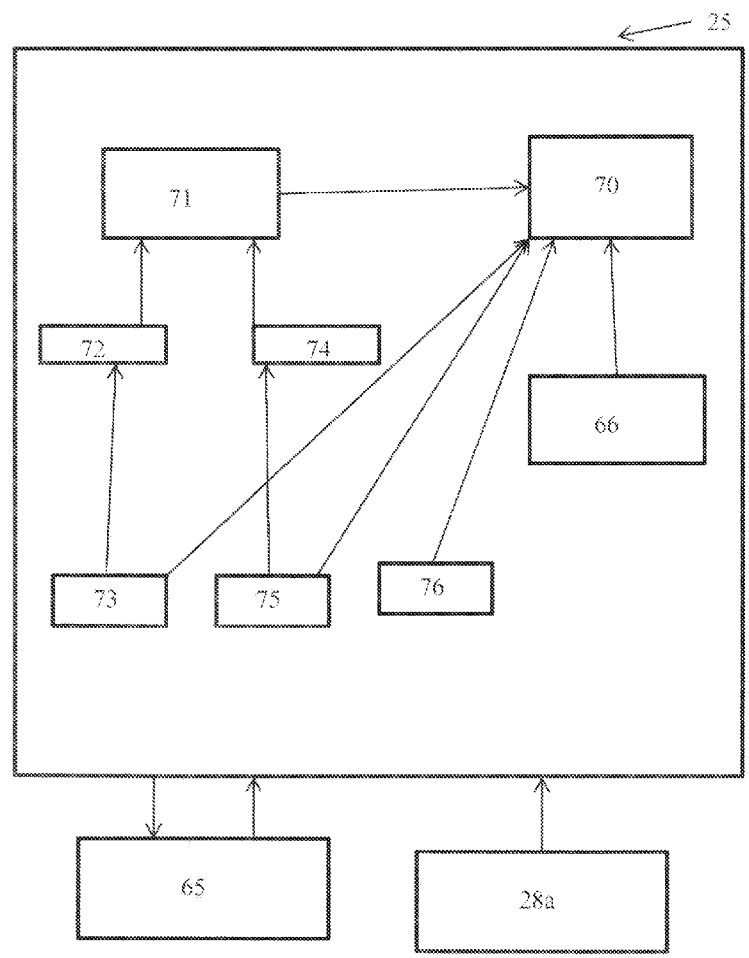
FIG. 2A is a block diagram of a preferred embodiment of a cloud manager.

FIG. 2A provides an in-depth illustration of the cloud manager 25. The cloud manager 25, which is inside the IDE 23, synchronizes with the remote site manager model 65 for a given user and sends updates to the site manager model 65. The cloud manager 25 synchronizes directly against Web applications 32 via model information return in the site manager model 65. This is used for the Web application statistics model 66 which is shown graphically to the user. The cloud manager 25 synchronizes with cloud site model 28a. A core model object 70 is configured for model elements to synchronize against a remote model representation. Core model object 70 and core group object 71 does all of the following: fire events 75 when the remote model changes; delete themselves from the remote model; and serializes to a local data store 72 and 73 to enable an off-line mode. Each core model object 70 has a unique, well-known remote location 76, against which it is synchronized. The cloud manager 25 is configurable with request and response protocol handlers. Request protocol handlers authenticate a request, while response protocol handlers are responsible for decoding a response into a form, from which the object may be rebuilt. The listener architecture allows subscription to a root element, which will subscribe the listener to all child objects of that model element.

Figure 2B:
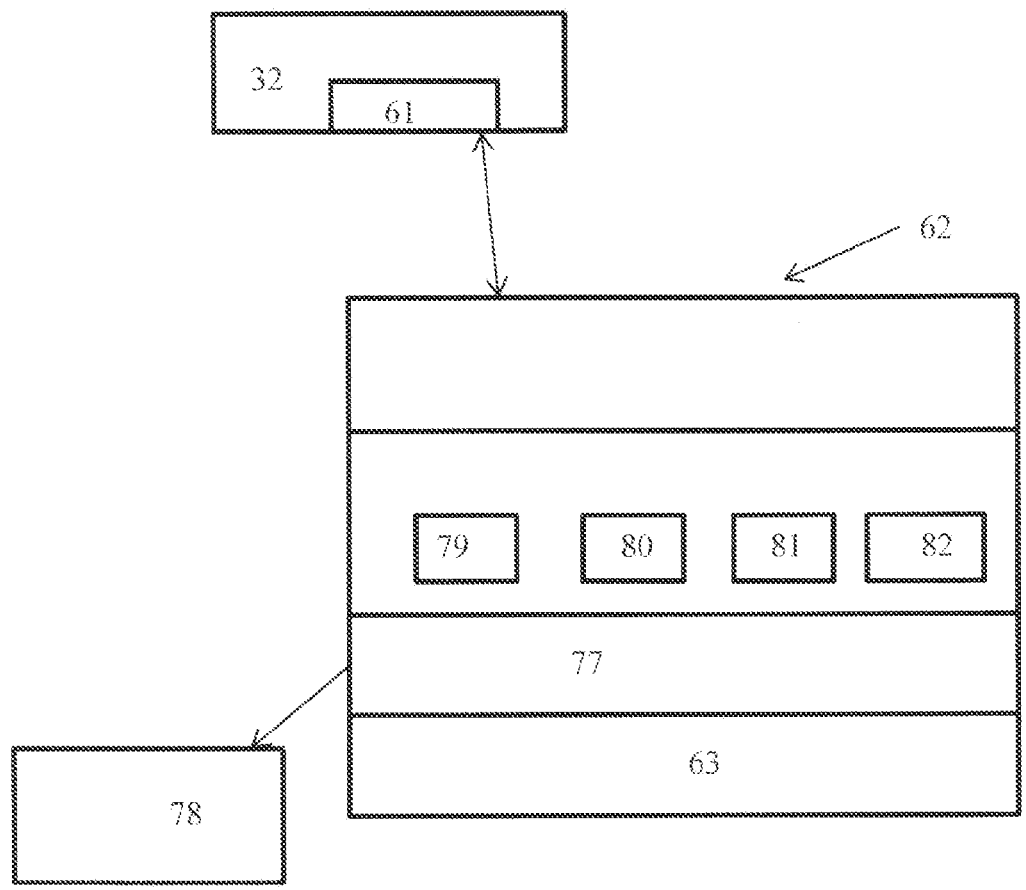
FIG. 2B is a block diagram of a preferred embodiment of isolated components of the software architecture.

FIG. 2B illustrates interactions with a comet server 61. Comet clients 62 are pieces of IDE functionality that are called from the My Cloud Web application 32. Comet clients 62 fire events on well-known channels to update content. Comet clients 62 also respond to requests to get or set properties on remote model elements. In addition, they handle requests to synchronize the local and remote cloud application files. Comet clients 62 are configured via XML and dynamically loaded when the JETTY HTTP Server 63 is started. A Comet client loader 77 loads a Comet client configuration file 78. Comet clients 62 are contributed across multiple IDE plugins. The JETTY HTTP Server 63 serves both Comet requests and standard HTTP content requests. The Comet clients 62 integrate with requests for user interface elements outside the browser, including: opening wizards interface 81, views, perspectives, statistics client interface 82, deploy project client interface 79; and starting or stopping the local JAXER™ server interface 80. The Cornet clients 62 also respond to requests to start, stop or restart services on the remote cloud application.

The core model object 70 interfaces with an ILocationObject. Each object has a unique location that is used to obtain and update the remote model for the object. The core model object 70 also interfaces with the ISynchronizableObject. Each object has a core set of methods to synchronize with the remote model. The core set of methods include the following: commit; update; perform action; and delete. The core model object 70 interfaces with the ITransformObject. Each object is able to serialize and de-serialize itself from either the remote format received from the Site Manager or the format obtained from the local data store when the Site Manager is unreachable. The core model object 70 further interfaces with the IModifiableObject. Each object is able to detect changes in the model and notify listeners when model changes occur. The core model object 70 implements the interfaces. The core group object 71 extends the core model objects 70 and allows encapsulation of grouped objects that are obtained from a single web service call. The group as a whole may be synchronized, or, alternatively, individual objects in the group may be synchronized.

Figure 3:
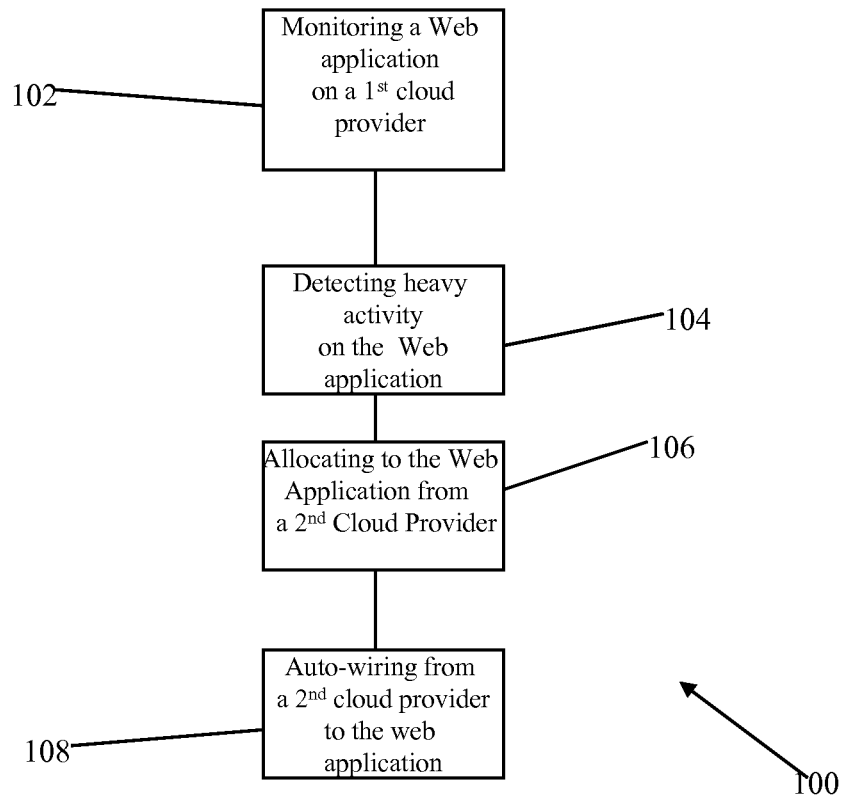
FIG. 3 is a flow chart of a general method for managing and monitoring a web application that uses multiple cloud providers.

FIG. 3 is a flow chart of a general method 100. At block 102, a web application located on a primary cloud provider is monitored by the cloud manager. At block 104, the cloud manager detects heavy activity on the web application. At block 106, the cloud manager contacts a secondary cloud provider to provide additional web resources for the web application and the additional web resources are allocated to the web application from a secondary cloud provider. At block 108, the cloud manager automatically wires the web resources from the secondary cloud provider to the web application.

Figure 4:
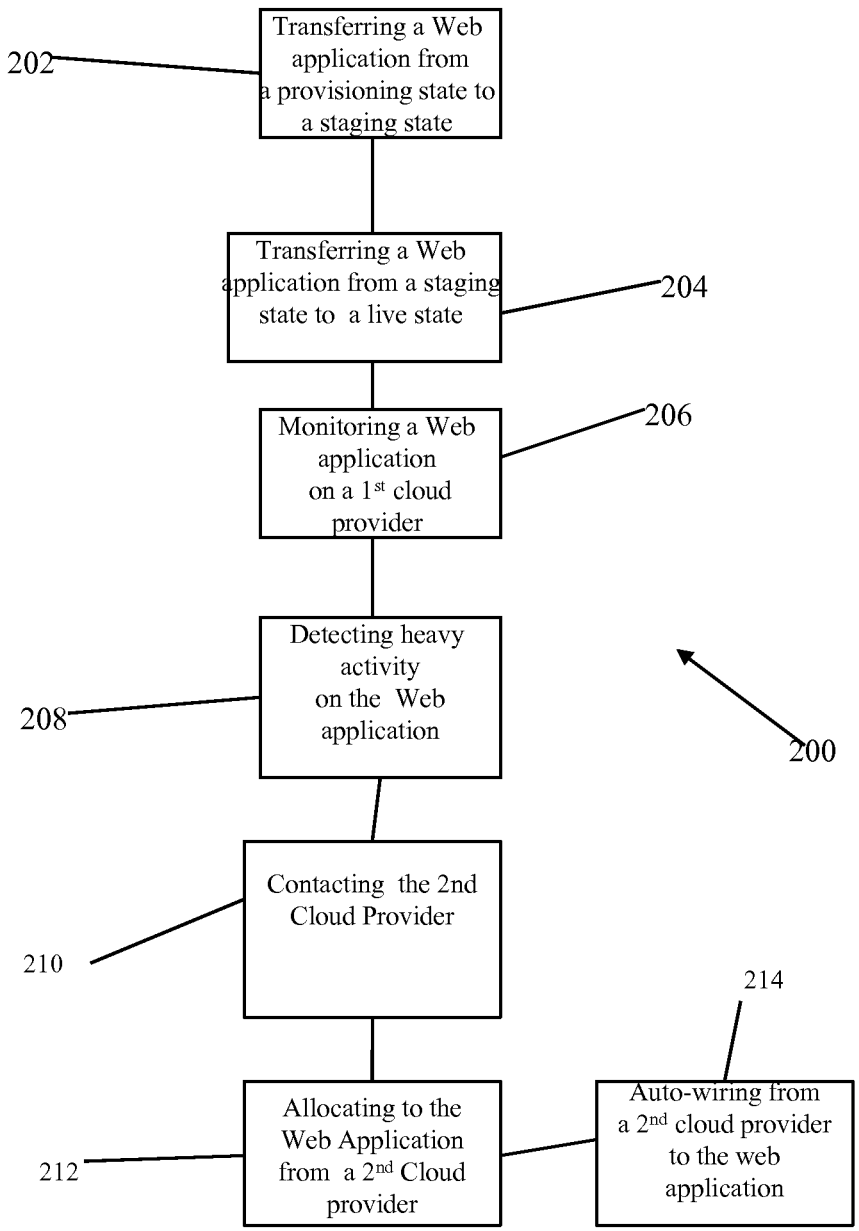
FIG. 4 is a flow chart of a specific method for managing and monitoring a web application that uses multiple cloud providers.

FIG. 4 is a flow chart of a specific method 200. At block 202, a web application is transferred from a provisioning state to a staging state by a cloud manager. At block 204, a web application is transferred from a staging state to a live state by the cloud manager. At block 206, the web application is monitored by the cloud manager. At block 208, the cloud manager detects heavy activity on the web application. At block 210, the cloud manager contacts a secondary cloud provider. At block 212, additional web resources are allocated to the web application from a secondary cloud provider through the cloud manager. At block 214, the cloud manager automatically wires the web resources from the secondary cloud provider to the web application.

Figure 5:
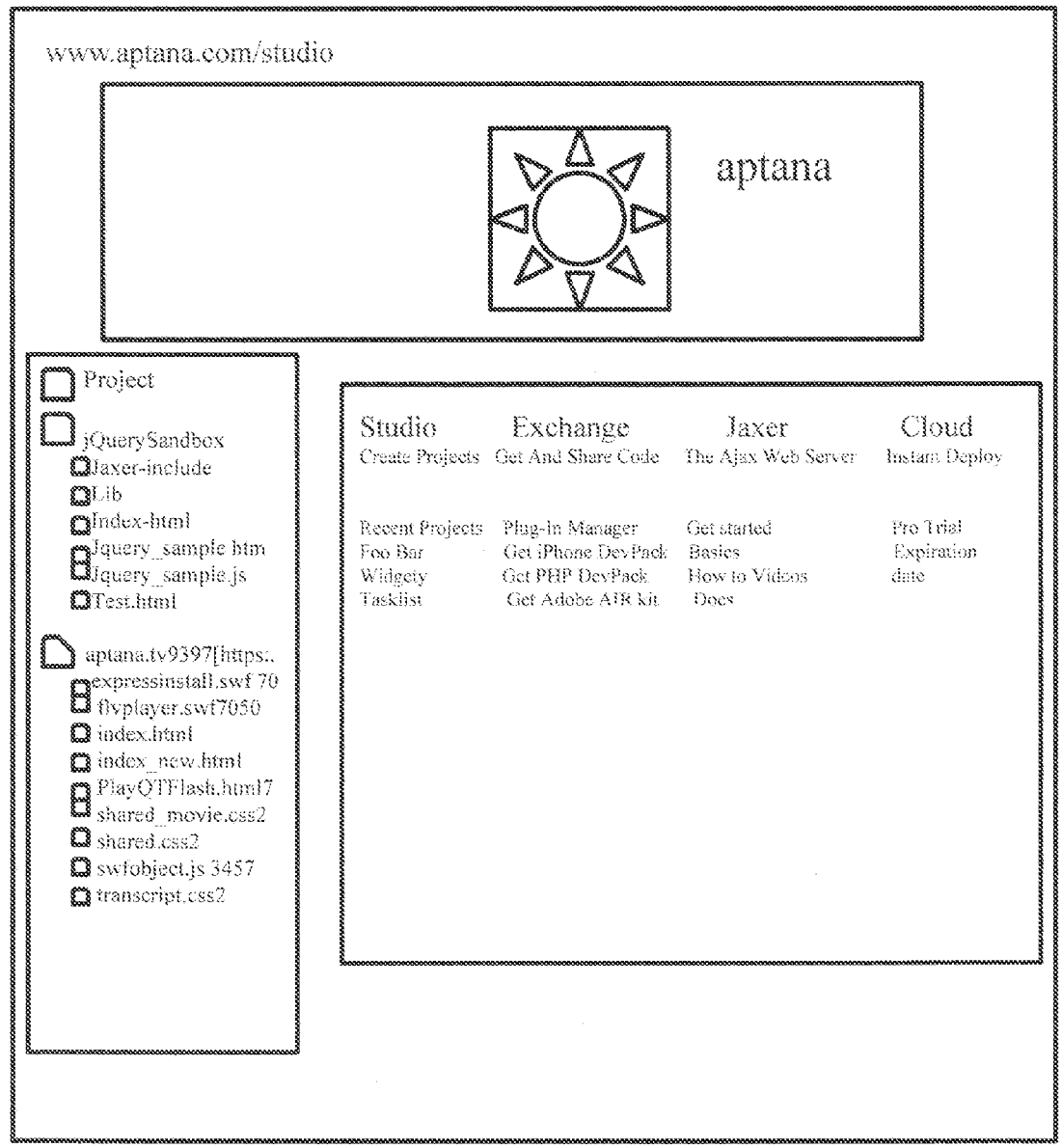
FIG. 5 is a screen page within an IDE on a user-interface illustrating a menu page with an IDE selected.

FIG. 5 illustrates the APTANA start page 300 with the Studio application (IDE) selected. Menus under the Studio application include create projects, recent projects, tasklist, and general Studio information.

The first step in deploying a project to Cloud is to set up a Web site name. By way of example, the user, who is deploying project "gullwing," is asked to enter a preferred Web site name for project "gullwing," such as "cars90210." APTANA Cloud then determines whether the preferred Web site name ("cars90210") is available. At step two, the user selects among various service plans available for the Cloud project. During the third step in deploying a project to Cloud, the user sets up enters his user information or sets up a new user account. Additional steps in deploying a project to Cloud include setting up billing information, accepting the Cloud services agreement, and confirming and placing the order. Upon placement of the order, the Web page is displayed, notifying the user that the site is being provisioned. Provisioning the site preferably includes the following steps: (1)

contacting APTANA Cloud: (2) setting up the necessary servers; and (3) configuring the Web site.

Figure 6:
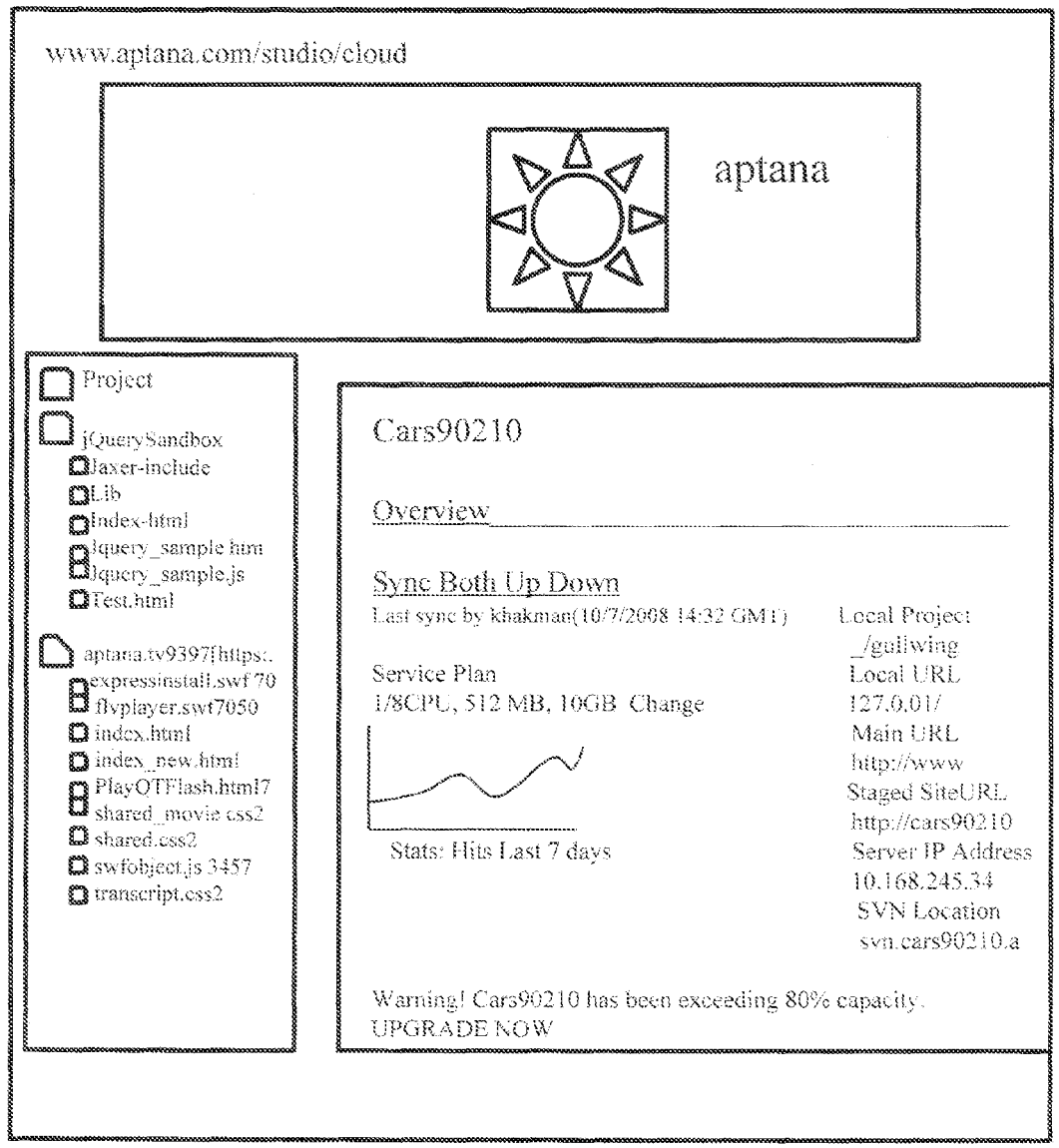
FIG. 6 is a screen page within an IDE on a user-interface illustrating a monitoring page for a Web Application.

Once a site has been provisioned on APTANA Cloud, a use may monitor the status of that Web site. FIG. 6 illustrates the particular My Cloud information for a selected site that is displayed to the user. For example, in the Web page 302 in FIG. 6, the details of the "cars90210" site are displayed under the "Overview" tab. Details include: the particular service plan selected for the site; a graph illustrating the number of hits for the site over a selected period of time; the local project name for the site; the local, main and staged site URLs; the server IP address; and the SVN location. In addition, an Events window may display any alerts regarding the site, such as a warning that the site is nearing its servers' capacity.

A user may add or invite additional users to the particular Cloud project. Users may be designated as either "admin" or "developer." Developers may sync projects, folders and files to the site. Admins have the ability to add or remove users for the site as well as sync projects, folders and files.

One of the benefits of APTANA Cloud is that it provides to the user valuable information regarding popularity of the project site such as "Hits Last 35 Days" for the project site "cars90210."

Figure 7:
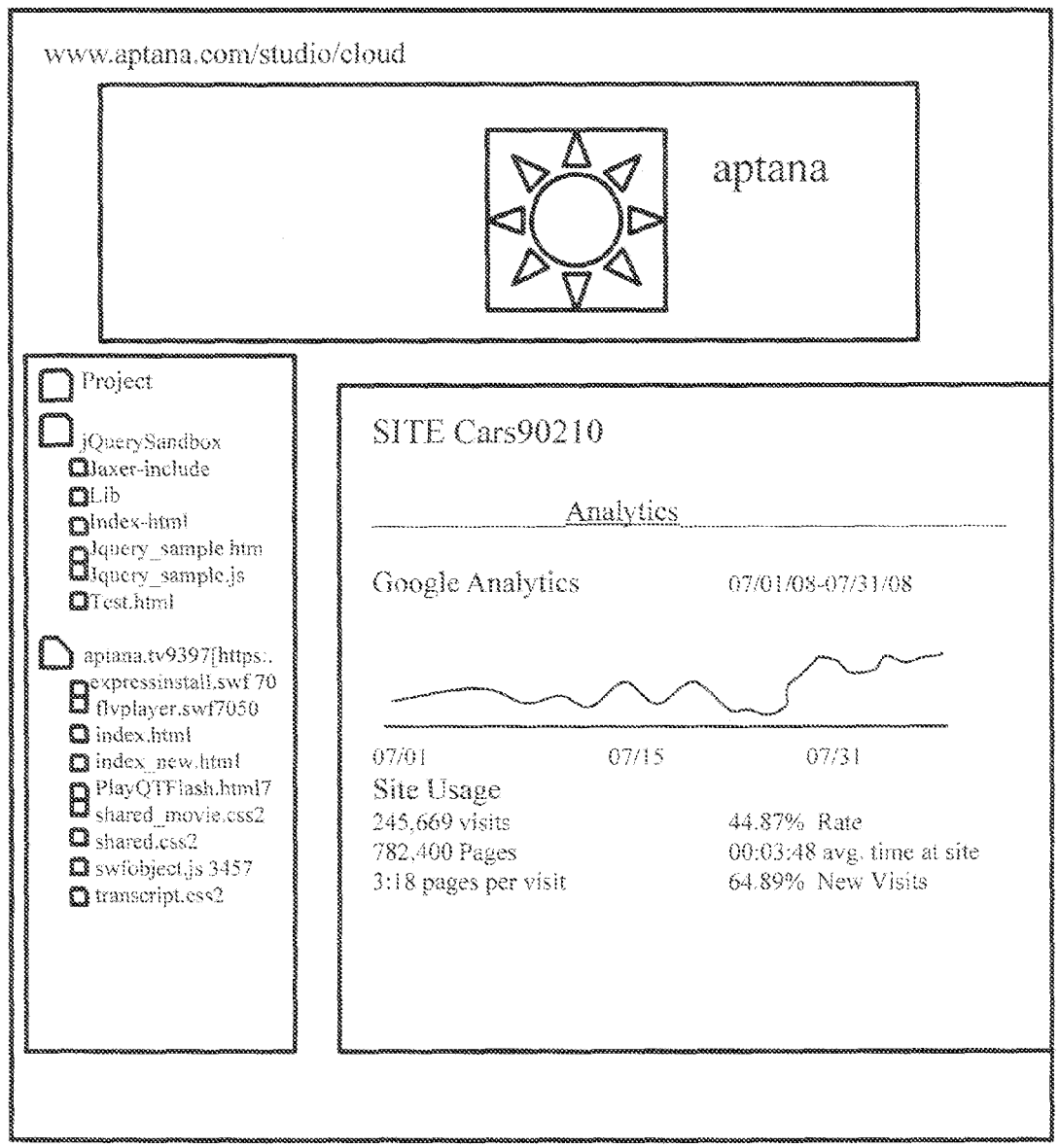
FIG. 7 is a screen page within an IDE on a user-interface illustrating a GOOGLE Analytics page for a Web Application.

With APTANA Cloud a user may incorporate GOOGLE Analytics to further monitor the project site. For example, the user may set up GOOGLE Analytics for the project site "cars 90210." Once the site has been set up with GOOGLE Analytics, future displays under the "Analytics" may be similar to that shown in the Web page 304 in FIG. 7, including graphical and numerical data regarding site usage.

Figure 8:
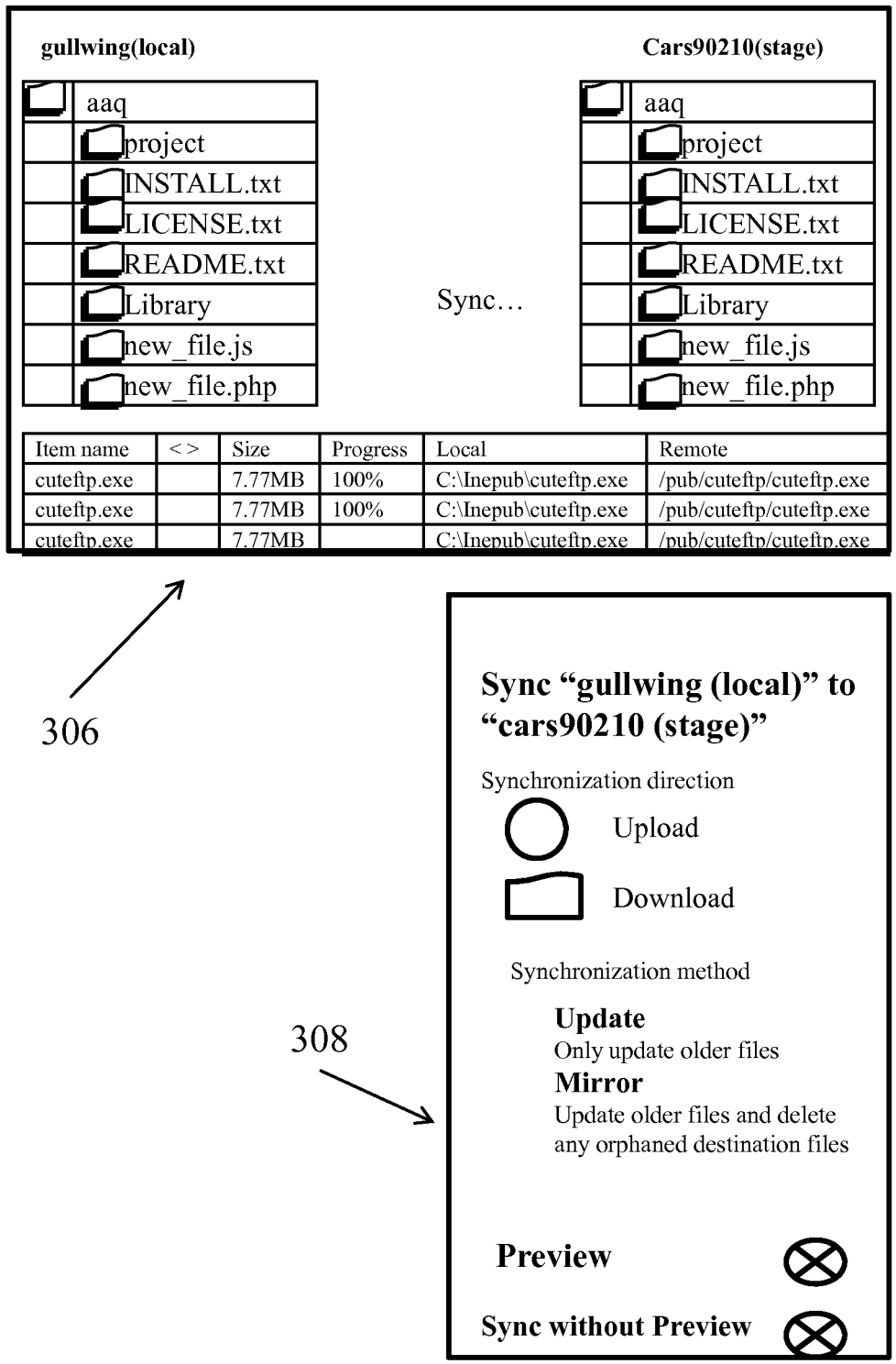
FIG. 8 illustrates a synching page for a Web Application from a site overview and a project view.
Figure 9:
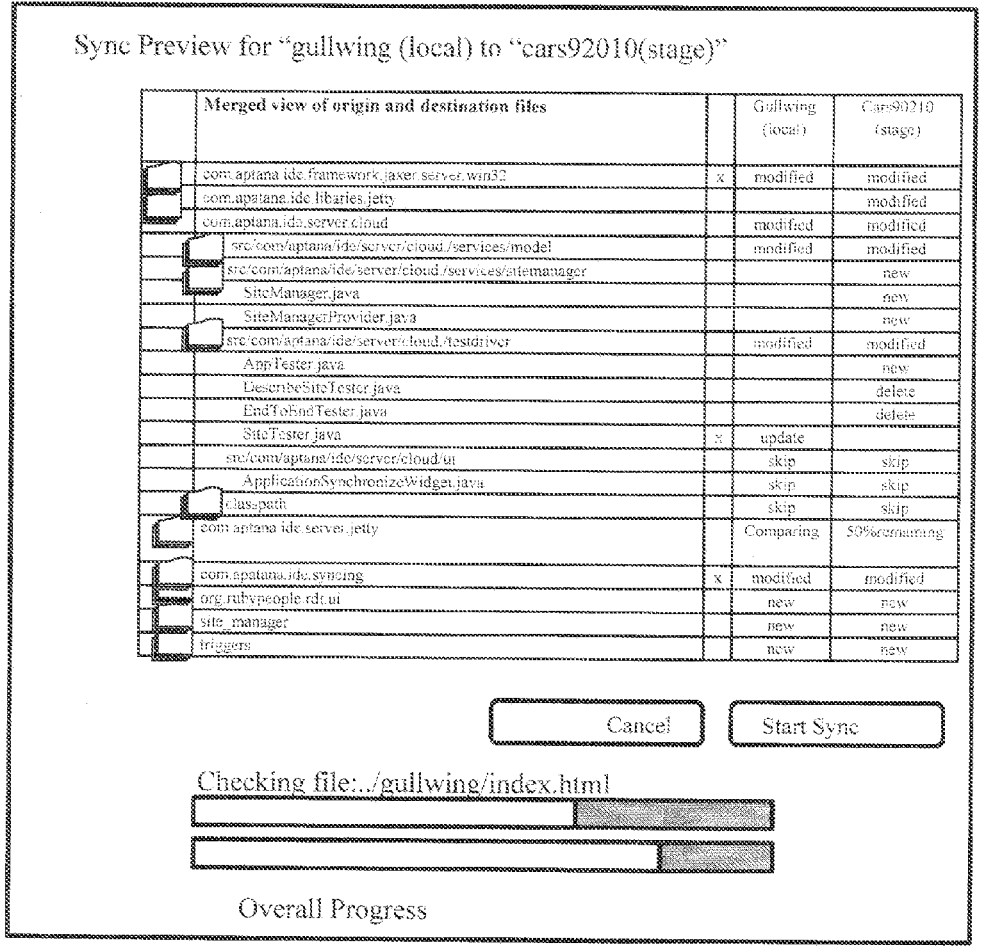
FIG. 9 is a screen page on a user-interface illustrating a synching page for a Web Application.

When the user modifies a project, the local site must then be synced with the stage site. FIG. 8 illustrates the synching of local site "gullwing" to project site "cars90210" with view of a Web site overview 306 and a project view 308. The Web page 310 shown in FIG. 9 provides further details regarding the syncing of the "gullwing" local site to the "cars90210" project site.

A detailed example of a preferred embodiment of the operation is set forth below.

Global IDE requests are made in the following manner:
Projects
   Client ID: 'projects'
   To Channel ID: '/portal/projects'
   Return Channel ID: '/portal/projects/'+publisherId
   Return Data: JSON array of project names
Show a project in the projects view:
   To Channel ID: '/portal/projects/show'
   To Data: project: 'project name'
   Return: Does not reply
Open a perspective
   To Channel ID: '/portal/perspectives/show'
   To Data: id: 'perspective id'
   Return: Does not reply
Open a view
   To Channel ID: '/portal/views/show'
   To Data: id: 'view id'
   Return: Does not reply
Open a browser
   To Channel ID: '/portal/browser'
   To Data: url: 'url to open in the browser'
   Return: Does not reply
Clients
   Client ID: 'client listing'
   To Channel ID: '/portal/client/listings'
   Return Channel ID: '/portal/client/listings'+publishedId
   Return Data: JSON array of client IDs Open a new project wizard
   Client ID: 'new project'
   To Channel ID: '/portal/projects/new'
   To Data: String id of wizard to open, defaults to web project wizard if empty string
   Return Channel: Does not reply
   Return Data: Does not reply
Get or set a preference
   To Channel ID: '/portal/preferences'
   To Data: request:'get'j'set' name:'name of pref value: 'value of pref if setting
   Return Data: action:'get' name:'name of pref' value:'value of pref if getting' (No return if setting)
Get the license status
   To Channel ID: '/portal/license'
   To Data: action:'licenseStatus'
type:'pro'j'trial'j'none'expires:'MM/DD/YYYY' (if license is pro or trial)
Open a wizard
   To Channel ID: '/portal/wizard'
   To Data: id:'wizard id' request:'new'l'import'l'export'
   No reply
   Aptana ID requests are generated as follows:
Get signed in user
   Client ID: 'aptana,--user'
   To Channel ID: '/portal/user'
   Return Channel ID: '/porta I/user/'+pu bl isherId
   Return Data: User name or empty string if no user signed in
Sign In a User
   Client ID: 'aptana_user_login'
   To Channel ID: '/portal/user/login'
   To Data:
   request: 'loginUser'
   username: 'username'
   password: 'password'
   Return Channel: '/portal/user/'+publisherId
   Return Data:
   action: 'loginUser'
   userValid: true/false
   usernameValid: true false
   passwordValid: true false
Log Out a User
   Client ID: TBD
   To Channel ID: '/portal/user/logout'
   To Channel Data:
   arequest: 'logoutUser'
   Return Channel: '/portal/user/'+publisherId
   Return Data:
   action: 'logoutUser'
   success: true/false
Create New User
   Client ID: TBD
   To Channel ID: '/portal/user/create'
   To Channel Data:
   request: 'createUser'
   username: 'username'
   password: 'password'
   email: 'email'
   Return Channel: '/portal/user/'+publisherId
   Return Data:
   action: 'createUser'
   success: true/false
   usernameValid: true/false (false if username used)
   (any other reasons for failure can be added . . . )

To Make Message center requests, the following are preferably used:
Display the message center
    To Channel ID: '/portal/messages/show'
    To Data: none
    Return: Does not reply
Unread message count
    Client ID: 'unread messages'
    To Channel ID: '/portal/messages'
    Return Channel ID: Vporta I/messages/'+pu bl isherId
    Return Data: Integer value of the number of unread messages
Urgent unread message count
    To Channel ID: '/portal/messages/urgent'
    Return Channel ID: '/portal/messages/urgent/'+publisherId
    Return Data: Integer value of the number of urgent unread messages
    Plugins/Features requests are generated as follows:
Plugins List
    Client ID: TBD
    To Channel ID: '/portal/plugins/list'
    To Data:
    request: 'listPlugins'
    Return Channel ID: '/portal/plugins/list/'+publisherId
    Return Data:
    action: 'listPlugins'
    popular: [(array of hash maps . . . )
        id: 'pluginId'
        name: 'pluginName'
        description: 'plugin Description'
        link: 'pluginSiteLink'
        installed: true/false (whether or not the plugin is installed)
        update: true/false (whether or not an update is available)
    other: same spec as above, this is the list of third-party plugins
Plugins to Install (Deprecated in favor of above . . . )
    Client ID: 'install plugins'
    To Channel ID: '/portal/plugins/list'
    Return Channel ID: '/portal/plugins/list'+publisherId
    Return Data: JSON structure of plugins that are installable
Get changes features
    Client ID: 'feature changes'
    To Channel ID: '/portal/features/changes
    Return Channel ID: '/portal/features/changes/'+publisherId
    Return Data: action:'featureChanges' changesExist: true I false
changes: [{icl:'feature id', label:'label',newVersion:'new version', oldVersion:'old version', provider:'provider'} . . . ]
Install a plugin
    To Channel ID: '/portal/plugins/install'
    To Message: String plugin id to install
    Return Channel ID: '/portal/plugins/install'+publisherId
    Return Data: true if the plugin install was successfully launched
Check for plugin updates
    Client ID: 'check-for-updates'
    To Channel ID: '/portal/plugins/updates'
    Return Channel ID: '/portal/plugins/updates/'+publisherId
    Return Data: 'true' I 'false' if a update search was scheduled JAXER server requests are made as follows:
Show Jaxer Shell view
    Client ID: '/Portal/jaxer/JaxerClient'
    To Channel ID: '/portal/jaxer/laxerShellView'
Show Jaxer Activity Monitor view
    Client ID: '/Portal/jaxer/JaxerClient'
    To Channel ID: '/portal/jaxer/jaxerActivityMonitor'
Show Jaxer preference page
    Client ID: '/portal/jaxer/JaxerClient'
    To Channel ID: '/portal/jaxer/jaxerPreferences'
Show Servers view
    Client ID: '/portal/jaxer/JaxerClient'
    To Channel ID: '/portal/jaxer/jaxerServersView'
Show Jaxer Package Server dialog
    Client ID: '/Portal/jaxer/laxerClient'
    To Channel ID: '/portal/jaxer/jaxerPackageServer'
Get internal Jaxer server state
    Client ID: '/Portal/jaxer/JaxerController'
    To Channel ID: '/portal/jaxer/jaxerController'
    To Data: request:'serverStatus'
    Return Channel ID: '/portal/jaxer/jaxerController/'+publisherId
    Return Data action:'serverStatus' status: 'running'j'stopped'
Set internal Jaxer server state
    Client ID: '/Portal/jaxer/laxerClient'
    To Channel ID: '/portal/jaxer/jaxerController'
    To Data: req uest:'control Server' setState:'start'j'stop'
    Return Channel ID: '/portal/jaxer/jaxerController'
    Return Data: action:'controlServer' setState:'done'
    Cloud-specific requests are preferably generated as follows:
List the available products
    To Channel ID: '/portal/cloud/products'
    Return Channel ID: '/portal/cloud/products'+publisherId
    Return Data: action:'listProducts' products: [{name: 'product name', active:'active state', id:'product id'} . . . ]
Browse to a cloud sftp node
    To Channel ID: '/portal/cloud/site/browse'
    To Channel Data: id:'site id' request:'showFile'
    Return: does not reply
Browse to a remote cloud file
    To Channel ID: '/portal/cloud/site/browse'
    To Channel Data: id:'site id' request:'showFile' path:'absolute path to file to display in the file view'
    Return: does not reply
Open a remote cloud file
    To Channel ID: '/portal/cloud/site/browse'
    To Channel Data: id:'siteid' request:'open File' path:'absolute path to file to display in the editor'
    Return: does not reply
Open the sync explorer to a project and cloud sftp site
    To Channel ID: '/portal/cloud/site/browse'
    To Channel Data: id:'site id' request:'showExplorer'
    Return: does not reply
Get the name, type, and deployed status of all workspace projects
    To Channel ID: '/portal/projects/list'
    Return Channel ID: '/portal/projects/undeployed'+publisherId
    Return Data: projectsExist: true I false projects:[{name: 'project name', type:'a i r'J'web'J'rai Is'J'ph p'l'un known', deployed: true I fa Ise, siteId:'id of site if deployed'}]
Log to cloud console and ide log
    To Channel ID: '/portal/cloud/log'
    To Data: string that should be logged
    Response: none Get site statistics
    To Channel ID: '/portal/cloud/statistics'
    To Data: request:'getStats' type:'web'J'resources' id:'site id'
    Response Channel ID: '/portal/cloud/statistics/'+publisherId
    Response Data:
    action: 'getStats'
    id:'site id'
    type: 'web'J'resources'
    groups: [{
        startHour:'two digit hour'
        startMinute:'two digit minute'
        date:'month/day date string'
        groupName: 'groupName' (i.e. Memory, Swap, Hits, etc.),
        dataItems: [{
            data: [array of data.. [1,1],[2,2], . . . ]
            label: seriesLabel (what will show in the legend)
            {more data as determined by group name
            (usually avg., max, min, etc.)} ]
    other groups as determined by type 1]
Change project association for a site is preferably generated as follows:
    To Channel ID: '/portal/cloud/site/project'
    To Data: req uest:'ch a nge Project' project:'project name' site:'site id'
    Return Channel ID: '/portal/cloud/site/project/'+publisherId
    Return Data: actio n:'cha n ge Project' project:'project name' site:'site id'
Perform a backup (data dump) on a site is preferably generated as follows:
    To Channel ID: '/portal/cloud/site/dump'
    To Data: request:'dumpData' id:'site id'
    Return Channel ID: '/portal/cloud/site/dump/'+publisherId
    Return Data: action:'dumpData' success: true I false id:'site id'
Sync a site is preferably generated as follows:
    To Channel ID: '/portal/cloud/sync'
    To Data: request:'syncSite' siteId:'id of site to sync'
    Return Data: None, start syncs dialog.
Site manager availability is preferably generated as follows:
    Client ID:'/portal/cloud/available'
    To Channel ID:'/portal/cloud/available'
    Return Channel ID:'/portal/cloud/available/'+publisherId
    Return Data: action:'cloudStatus' availableftrue I false
Domain name availability is preferably generated as follows:
    Client ID: '/portal/cloud/deploy/checkSiteName'
    To Channel ID: 'portal/cloud/deploy'
    Message Data: request:'checkSiteName' siteName:'site name to check'
    Return Channel ID: '/portal/cloud/deploy'+publisherId
    Return Data: request:'checkSiteName' siteUsed: true I false
User name availability is preferably generated as follows:
    Client ID: '/Portal/cloud/deploy/checkUserName'
    To Channel ID: '/portal/cloud/deploy'
    Message Data: request:'checkUserName' userName:'user name to check'
    Return Channel ID: '/portal/cloud/deploy'+publisherId
    Return Data: action:'checkUserName' na meUsed: true I false
Validate user is preferably generated as follows:
    Client ID: '/portal/cloud/deploy/validateUser'
    To Channel ID: '/porta I/cl o u d/de ploy'
    Message Data: request:'validateUser'
    username:'user name' password:'password'
    Return Channel ID: '/portal/cloud/deploy'+publisherId
    Return Data: action:'validateUser' userVal id: true I false userId:"userId"
    userna me0k: true I false password0k: true I false
    describeUser
    createUser
    updateUser
    deleteUser
Deploy a project
    Client ID: '/portal/cloud/deploy/createSite'
    To Channel ID: '/portal/cloud/deploy'
    To Data:
    req uest:'de ploy Project'
    userId:'user name'
    password:'password'
    siteName:'domain to create'
    project:'name of workspace project'
    servicePlanId:'type of site to create, 'jaxer' for now'
    billingInfo:
        firstName:'first name'
        lastName:'last name'
        address1:'address 1'
        address2:'address 2'
        city:'city'
        state:'two-digit state'
        country:'country code'
        zip:'zip code'
        phone:'phone number'
        billingName:'name on the credit card'
        creditCardNumber:'credit card number'
        expiration:'credit card expiration'
        cvv2:'code from card'
    Return Channel ID: '/portal/cloud/deploy/'+publisherId
    Return Data: action:'deployProject' siteCreated: true I falseid: <id of site created>
    error: <error message if one exists, only uses this value if siteCreated:false>
List sites
    Client ID: 'list sites'
    To Channel ID: '/portal/cloud/sites'
    Return Channel ID: '/portal/cloud/sites/'+publisherId
    Return Data: action: 'listSites' sites: [{id: 'siteId', status: 'running/error/
    pending', name: 'site name' empty array if no sites or user not logged in
Describe a site
    To Channel ID: '/portal/cloud/sites'
    Return Channel ID: '/portal/cloud/sites/' +publisherId
    To Data:
    request: 'siteInfo'
    id: 'siteId'
    refresh: true I false (optional, if true return action will be siteInfo Refresh)
    Return Data:
    action: 'siteInfo'
    type: 'servicePlanType' (jaxer for now)
    project: 'projectName'
    domain: 'siteDomain'
    ip: 'siteIp'
    svn:'svn url'
    backups:'backups url'
    db:'url to php my admin'
    analytics:'google analytics url'
    resources:'resource stats url'
    webstats:'web stats url' jaxerLog:'path to jaxer log'
jaxerLogJS:'path to jaxerLog.js'
jaxerAppsJS:'path to jaxerApps.js'
jaxerConfigJS:'path to config.js'
privateLog:'path to access log for private area'
privateErrorLog:'path to error log for private area'
publicLog:'path to access log for public area'
publicErrorLog:'path to error log for public area'
disk:'latest stats of the percentage of disk being used'
diskMax:'double number of gigs on box'
status: 'Running/Pending/Error'
monitoring: true I false
lastSync:'last sync event content'
lastSyncTime:'last sync event timestamp'
lastDump:'last dump event content'
lastDumpTime:'last dump event timestamp'
id: 'siteId'
events: [ ] (eventually an array of hash objects for messages
List the events for a site
   To Channel ID: '/portal/cloud/site/events'
   To Data: request:'listEvents'
   Return Channel: '/portal/cloud/site/events'
   Return Data: action:'listEvents' id:'site id'
   events:[{time:'timestamp',severity:'severity id', value: 'event content'}]
List the services on a site
   Client ID: '/portal/cloud/services'
   To Channel ID: '/portal/cloud/services'
   To Data: request:'listServices' id:'site id'
   Return Channel ID: '/portal/cloud/services/'+publisherId
   Return Data: action:'listServices' services: [{name:'service name', status:'service status',
version:'0.9.7.2824',commands:['command name',...]}...]
Stop/Start a service on a site
   To Channel ID: '/portal/cloud/services'
   To Data: request:'changeService' id:'site id'
   serviceAction:'start'j'stop'l'restart'
Upgrade a service on a site
   Client ID: '/portal/cloud/services'
   To Channel ID: '/portal/cloud/services'
   To Data: request:'changeService' id:'site id'
   serviceAction:'upgrade' version:'new version to upgrade to'
Service events
   Return Channel ID: '/portal/cloud/site/events/'+siteId+'/services'
   Return Data: {action:'serviceEvent', id:'site id', name:'service name', version:'service version', status:'service status'}
List available site versions
   To Channel ID: '/portal/cloud/services/versions'
   Return Channel ID: '/portal/cloud/services/versions/'+publisherId
   Return Data: action:'listVersions' services: [{name:'service name', versions: ['version V,...]}]
   configureSite; rebootSite; deleteSite; getStats; listRoles; addAccount;
   deleteAccount; create Delegation; delete Delegation; listDelegations;
Get the Channel types.
   To Channel ID: '/portal/cloud/channelTypes'
   Response Channel ID: '/portal/cloud/channelTypes/'+publisherId
   Response Data: action:'listChanneiTypes' types:
   [{icl:'channel type id', name:'channel type name'},...]
Get the Event types
   To Channel ID: '/portal/cloud/eventTypes'
   Response Channel ID: '/portal/cloud/eventTypes/'+publisherId
   Response Data: action:'listEventTypes' types:[{id:'event type id', name:'event type name'},...]
Get the subscriptions a user has:
   To Channel ID: '/portal/cloud/subscriptions'
   To Data: request:'IjstSubscriptions'
   Return Channel ID: '/portal/cloud/subscriptions/'+publisherId
   ResponseData:action:'ListSubscriptions'subscriptions:
[{id:'subscriptionid',event:{id:'eventtypeid',name:'eventtyp ename'}, channel:{id:'channelid',name:'channeltypename',value:'
channel value'}]
Add a subscription
   To Channel ID: '/portal/cloud/subscriptions'
   To Data: request:'addSubscription', value:'subscription value',
   channel:'channel type id', event:'event type id'
   Return Channel ID: '/portal/cloud/subscriptions/'+publisherId
   Response Data: action:'addSubscription' success: true J false
Delete a subscription
   To Channel ID: '/portal/cloud/subscriptions'
   To Data: request:'deleteSubscription', id:'subscription id'
   Return Channel ID: '/portal/cloud/subscriptions/'+publisherId
   Response Data: action:'deleteSubscription' success: true I fa Ise
List the billing accounts
   To Channel ID: '/portal/cloud/billing'
   To Data: request:'listBilling'
   Response Data: action:'listBilling' accounts: [{id:'billing account id', name:'billing name', number:'billing number',
   expiration:'billing expiration
Delete a billing account
   To Channel ID: '/portal/cloud/billing'
   To Data: request:'deleteBilling' id:'billing account id'
   Response Data: action:'deleteBilling' success: true I false
Add a billing account
   To Channel ID: '/portal/cloud/billing'
   To Data: request:'addBilling' name:'billing name'
   number: 'billing number' expiration:'billing expiration'
   Response Data: action:'addBilling' success: true I fa Ise
List the site memberships
   To Channel ID: '/portal/cloud/memberships'
   To Data: request:'listBilling'
   Response Data: action:'listMemberships' memberships: [{role:'role id', user:'user id'}]
Delete a billing account
   To Channel ID: '/portal/cloud/memberships'
   To Data: request:'deleteMembership' id:'membership id' site:'site id'
   Response Data: action:'deleteMembership' success: true I false
Add a membership
   To Channel ID: '/portal/cloud/memberships'
   To Data: request:'addMembership' role:'role id' user:'user name' id:'site id'

Response Data: action:'addMembership' success: true false
deleteSite
   Client ID: TBD
   To Channel ID: '/portal/cloud/sites'
   To Data:
   request: 'deleteSite'
   id: 'siteId
   Return Data
   action:'deleteSite' success: true false
backupSite
suspend Site
restoreSite
unsuspendSite
listBackups
describeBackup
remove Backup From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system for managing a web application, the system comprising:
   a network;
   a primary cloud provider having a primary plurality of web resources comprising server computers;
   a web application located at the primary cloud provider;
   at least one secondary cloud provider having a secondary plurality of web resources comprising server computers;
   a cloud manager having an application programming interface, and a computer onto which the cloud manager is loaded within an integrated development environment from a local data store model and synchronizes with a remote site manager model for a given user and synchronizes with the web application through remote model information returned in the remote site manager model, and a core model object fires model change events when the remote model changes, the cloud manager remotely managing the web application via the network, including, via the application programming interface, selectively providing the web application access to the web resources of the primary cloud provider and the secondary cloud provider, wherein the cloud manager is capable of monitoring the web application to determine if a current level of web resources is appropriate for the web application to perform within a predetermined performance range and, in response, accessing and providing the primary plurality of web resources from the primary cloud provider to the web application and accessing and providing the secondary plurality of web resources from the secondary cloud provider to the web application.

2. The system according to claim 1 further comprising a plurality of secondary cloud providers, each of the plurality of secondary cloud providers having a secondary plurality of web resources, and wherein the at least one secondary cloud provider is included in the plurality of secondary cloud providers.

3. The system according to claim 1, wherein the cloud manager communicates with the primary cloud provider and the at least one secondary cloud provider through the application programming interface over the network, and wherein the cloud manager comprises a web application that is located inside an embedded web browser of the integrated development environment.

4. The system according to claim 1 further comprising an internal IT site, the cloud manager in communication with the internal IT site through the application programming interface.

5. The system according to claim 1 wherein the cloud manager is capable of changing the web application from a live state to a staging state.

6. The system according to claim 1 wherein the cloud manager is capable of changing the web application from a provisioning state to a staging state to a live state.

7. The system according to claim 1, wherein the cloud manager communicates with an operator of the web application through a user interface.

8. The system according to claim 1 wherein the cloud manager varies the level of web resources available to the web application according to a predetermined daily time schedule.

9. The system according to claim 1 wherein the web application has between two and four servers available during a first time period and four and eight servers available during a second time period.

10. The system according to claim 1 wherein the cloud manager provides auto scaling of the web application resources.

11. A system for remotely managing a web site utilizing multiple cloud providers, the system comprising:
   a network;
   a primary cloud provider having a primary plurality of web resources comprising server computers;
   a web site located at the primary cloud provider;
   a plurality of secondary cloud providers, each of the plurality of secondary cloud providers having a secondary plurality of web resources comprising server computers;
   a cloud manager application programming interface, and a computer onto which the cloud manager is loaded within an integrated development environment from a local data store model and that synchronizes with a remote site manager model for a given user and synchronizes with a web application through remote model information returned in the remote site manager model, and a core model object fires model change events when the remote model changes, the cloud manager remotely managing the web site via the network, including, via the application programming interface, selectively providing the web site access to the web resources of the primary cloud provider and the secondary cloud providers, wherein the cloud manager is capable of monitoring the web site to determine if a current level of web resources is appropriate for the web application to perform within a predetermined performance range and, in response, accessing and providing the primary plurality of web resources from the primary cloud provider to the web site and accessing and providing the secondary plurality of web resources from each of the secondary cloud providers to the web application.

12. A method for remotely managing a web site utilizing multiple cloud providers, the method comprising:

monitoring activity of a web application located at a primary cloud provider from a cloud manager that is remote from the web site, and that is loaded onto a computer within an integrated development environment from a local data store model and that synchronizes with a remote site manager model for a given user and synchronizes with the web application through remote model information returned in the remote site manager model, and a core model object fires model change events when the remote model changes;

detecting, utilizing the cloud manager, activity outside of a predetermined load to capacity ratio on the web application;

contacting a secondary cloud provider from the cloud manager to obtain a plurality of web resources for the web application;

utilizing the cloud manager, allocating the plurality of web resources from the secondary provider to maintain a predetermined load to capacity ratio for the web application; and automatically wiring the plurality of web resources from the secondary provider through the cloud manager to the web application.

13. The method according to claim 12 wherein the predetermined load to capacity has an upper limit of 90% (9/10).

14. The method according to claim 12 wherein the predetermined load to capacity ratio has a lower limit of 75% (3/4).

15. The method according to claim 12 wherein the plurality of web resources are a plurality of servers.

* * * * *